(12) United States Patent
Joglekar et al.

(10) Patent No.: US 11,810,185 B2
(45) Date of Patent: Nov. 7, 2023

(54) SYSTEMS AND METHODS FOR GENERATING BEHAVIOR PROFILES FOR NEW ENTITIES

(71) Applicant: Visa International Service Association, San Francisco, CA (US)

(72) Inventors: Pushkar Joglekar, Emeryville, CA (US); Ajit Gaddam, Foster City, CA (US); Ara Jermakyan, Northridge, CA (US)

(73) Assignee: Visa International Service Association, San Francisco, CA (US)

( * ) Notice: Subject to any disclaimer, the term of this patent is extended or adjusted under 35 U.S.C. 154(b) by 744 days.

(21) Appl. No.: 16/629,740

(22) PCT Filed: Jul. 12, 2017

(86) PCT No.: PCT/US2017/041612
§ 371 (c)(1),
(2) Date: Jan. 9, 2020

(87) PCT Pub. No.: WO2019/013771
PCT Pub. Date: Jan. 17, 2019

(65) Prior Publication Data
US 2021/0103937 A1 Apr. 8, 2021

(51) Int. Cl.
*G06Q 10/0635* (2023.01)
*G06Q 30/018* (2023.01)
(Continued)

(52) U.S. Cl.
CPC .............. *G06Q 40/02* (2013.01); *G06F 18/22* (2023.01); *G06F 21/552* (2013.01);
(Continued)

(58) Field of Classification Search
CPC ........... G06Q 30/0185; G06Q 10/0635; G06Q 30/0201; G06Q 30/0224; G06Q 40/02;
(Continued)

(56) References Cited

U.S. PATENT DOCUMENTS

| | | | |
|---|---|---|---|
| 5,819,226 A * | 10/1998 | Gopinathan | G06Q 20/40 705/44 |
| 6,330,546 B1 * | 12/2001 | Gopinathan | H04M 15/47 705/38 |

(Continued)

FOREIGN PATENT DOCUMENTS

| | | | |
|---|---|---|---|
| CN | 102792635 A * | 11/2012 | H04L 63/1425 |
| WO | 0109746 A1 | 2/2001 | |

(Continued)

OTHER PUBLICATIONS

Quora "Why are matrices/vectors used in machine learning/data analysis?" 2014 https://www.quora.com/Why-are-matrices-vectors-used-in-machine-learning-data-analysis (Year: 2014).*

(Continued)

*Primary Examiner* — Gerardo Araque, Jr.
(74) *Attorney, Agent, or Firm* — THE WEBB LAW FIRM

(57) ABSTRACT

A method and system for generating a behavior profile for a new entity to be added to a behavior-monitored system include receiving feature data of a new entity and feature data of a plurality of pre-existing entities from at least one data source. The plurality of pre-existing entities are associated with a plurality of pre-existing behavior profiles. A doppelganger behavior profile is determined for the new entity based at least partially on the feature data of the new entity and the feature data of the plurality of pre-existing entities, and the doppelganger behavior profile is assigned to the new entity. A target action is implemented with respect (Continued)

to the new entity based at least partially on the doppelganger behavior profile assigned to the new entity.

14 Claims, 6 Drawing Sheets

(51) Int. Cl.
| | | |
|---|---|---|
| *G06F 18/22* | (2023.01) | |
| *G06F 21/55* | (2013.01) | |
| *G06Q 40/02* | (2023.01) | |
| *G06Q 30/0201* | (2023.01) | |
| *G06Q 30/0207* | (2023.01) | |

(52) U.S. Cl.
CPC ..... *G06Q 10/0635* (2013.01); *G06Q 30/0185* (2013.01); *G06Q 30/0201* (2013.01); *G06Q 30/0215* (2013.01); *G06Q 30/0224* (2013.01)

(58) Field of Classification Search
CPC .. G06Q 30/0215; G06K 9/6215; G06N 20/20; G06F 11/3438; G06F 21/552; G06F 21/566
See application file for complete search history.

(56) References Cited

U.S. PATENT DOCUMENTS

| | | | |
|---|---|---|---|
| 7,490,072 B1 | 2/2009 | Cowan et al. | |
| 8,972,414 B2 | 3/2015 | Posse et al. | |
| 9,185,095 B1 | 11/2015 | Moritz et al. | |
| 9,544,321 B2 | 1/2017 | Baikalov et al. | |
| 10,009,358 B1* | 6/2018 | Xie | G06F 21/552 |
| 10,084,805 B2* | 9/2018 | Nadolski | G06N 3/048 |
| 10,681,060 B2* | 6/2020 | Scheidler | G06N 20/00 |
| 11,323,469 B2* | 5/2022 | Wang | H04L 63/1425 |
| 2007/0156696 A1* | 7/2007 | Lim | G06F 9/468 |
| | | | 707/999.009 |
| 2010/0094768 A1* | 4/2010 | Miltonberger | G06Q 30/0185 |
| | | | 345/440.2 |
| 2011/0225644 A1* | 9/2011 | Pullikottil | H04L 63/1425 |
| | | | 726/11 |
| 2011/0317926 A1* | 12/2011 | Jonas | G06F 16/215 |
| | | | 382/209 |
| 2013/0204708 A1 | 8/2013 | Ramachandran et al. | |
| 2014/0165207 A1* | 6/2014 | Engel | H04L 63/1425 |
| | | | 726/25 |
| 2015/0006206 A1* | 1/2015 | Mdeway | G06Q 40/08 |
| | | | 705/4 |
| 2015/0026027 A1* | 1/2015 | Priess | G06Q 20/4016 |
| | | | 705/35 |
| 2015/0112918 A1 | 4/2015 | Zheng et al. | |
| 2015/0121518 A1* | 4/2015 | Shmueli | H04L 63/1425 |
| | | | 726/22 |
| 2016/0005050 A1* | 1/2016 | Teman | G06F 16/583 |
| | | | 705/317 |
| 2016/0030834 A1* | 2/2016 | Brown | G06Q 30/0631 |
| | | | 463/36 |
| 2016/0267498 A1 | 9/2016 | Suman | |
| 2017/0061448 A1* | 3/2017 | Akkiraju | G06Q 30/02 |
| 2017/0063911 A1* | 3/2017 | Muddu | G06F 40/134 |
| 2021/0120027 A1* | 4/2021 | Dean | H04L 63/1425 |

FOREIGN PATENT DOCUMENTS

| | | | | |
|---|---|---|---|---|
| WO | WO-2015021068 A2 * | 2/2015 | ......... | G06Q 30/0201 |
| WO | WO-2018004961 A1 * | 1/2018 | ......... | G06Q 30/0185 |

OTHER PUBLICATIONS

Dheepa et al. "Behavior Based Credit Card Fraud Detection Using Support Vector Machines" ICTACT Journal on Soft Computing, Jul. 2012, vol. 2, Issue 4 (Year: 2012).*

Zhong et al. "An overview on data representation learning: From traditional feature learning to recent deep learning" May 8, 2017 The Journal of Finance and Data Science 2 (2016) 265-278; available online at www.sciencedirect.com (Year: 2017).*

Remi Domingues "Machine Learning for Unsupervised Fraud Detection" Royal Institute of Technology School of Computer Science and Communication 2015 https://www.diva-portal.org/smash/get/diva2:897808/FULLTEXT01.pdf (Year: 2015).*

B. J. Berkley and A. Gupta, "Identifying the information requirements to deliver quality service," International Journal of Service Industry Management, vol. 6, (5), pp. 16, 1995 http://dx.doi.org/10.1108/09564239510101509 (Year: 1998).*

C. Whaley, "Three Fraud Trends," Independent Banker, vol. 61, (5), pp. 70-71, 2011 (Year: 2011).*

Hawlova, K. (2013). Fraud detection tools. Journal of Systems Integration, 4(4), 10-18 (Year: 2013).*

* cited by examiner

SYSTEMS AND METHODS FOR GENERATING BEHAVIOR PROFILES FOR NEW ENTITIES

CROSS-REFERENCE TO RELATED APPLICATION

This application is the United States national phase of International Application No. PCT/US2017/041612 filed Jul. 12, 2017, the disclosure of which is hereby incorporated by reference in its entirety.

BACKGROUND

Technical Field

This disclosure relates generally to determining behavior profiles for new entities and, in some non-limiting embodiments or aspects, to a method, system, and computer program product for generating a behavior profile for a new entity to be added to a behavior-monitored system.

Description of Related Art

Behavior-monitored systems, such as payment processing systems, monitor the behavior of functional entities to detect various anomalies. For example, payment processing systems include various functional entities, such as consumers or account holders, enterprise users, and enterprise systems. When a new entity is added to a conventional behavior-monitored system, a time period, which is typically at least several days, is needed for the new entity to create a behavior history in the system before behavior modeling rules can be applied to start detecting behavioral anomalies in the behavior of the new entity. This time period required to create the behavior history of the new entity can provide a window of opportunity for attackers to target the system, e.g., a time period before anomaly detection can begin for the new entity. For example, attackers may target new account holders, exfiltrate data by spoofing new enterprise users' accounts and/or new enterprise systems, and/or attempt other malicious activity in within the system through these new entities. Moreover, attacks on new enterprise systems may go undetected for longer periods of time.

Furthermore, automatic targeting of a new account holder with specific messages and incentives regarding use or increased use of a portable financial device and/or enrollment of the new account holder in a specific incentive program can be delayed until the behavior history for the new cardholder is sufficient to enable accurate targeting and enrollment. Moreover, access of a new enterprise user and/or enterprise system to various other systems within a behavior-monitored system typically must be provided manually by a user authorized to grant the new enterprise user and/or enterprise system access to the other systems.

Therefore, there is a need in the art for behavior-monitored systems to be able to begin detecting behavioral anomalies in the behavior of a new entity immediately after the new entity is added to the system, and for new entities to be more quickly targeted with accurate messages and incentives and/or enrolled in specific inventive programs, as well as to be provided with automatic access to other systems within a behavior-monitored system.

SUMMARY

Accordingly, provided is an improved method, system, and computer program product for generating a behavior profile for a new entity to be added to a behavior-monitored system.

According to some non-limiting embodiments or aspect, provided is a method for generating a behavior profile for a new entity to be added to a behavior-monitored system, comprising: receiving, with at least one processor, feature data of a new entity and feature data of a plurality of pre-existing entities from at least one data source, wherein the plurality of pre-existing entities are associated with a plurality of pre-existing behavior profiles; determining, with at least one processor, a doppelganger behavior profile for the new entity based at least partially on the feature data of the new entity and the feature data of the plurality of pre-existing entities; assigning, with at least one processor, the doppelganger behavior profile to the new entity; and automatically implementing, with at least one processor, a target action with respect to the new entity based at least partially on the doppelganger behavior profile assigned to the new entity.

In some non-limiting embodiments or aspects, the method further comprises monitoring, with at least one processor, activity data of the new entity with respect to the doppelganger behavior profile assigned to the new entity; analyzing, with at least one processor, the activity data of the new entity with respect to the doppelganger behavior profile assigned to the new entity to detect in an activity of the new entity at least one of fraud, an anomaly, and malicious intent; and automatically suspending, with at least one processor, at least one of an activity of the new entity, access of the new entity to a system, and a function of the new entity in a system in response to detection of the at least one of fraud, an anomaly, and malicious intent in an activity of the new entity.

In some non-limiting embodiments or aspects, the method further comprises automatically providing, with at least one processor, the new entity access to a pre-existing system based at least partially on the doppelganger behavior profile assigned to the new entity.

In some non-limiting embodiments or aspects, the method further comprises automatically providing, with at least one processor, a targeted offer to the new entity based at least partially on the doppelganger behavior profile assigned to the new entity.

In some non-limiting embodiments or aspects, the method further comprises converting, with at least one processor, the feature data of the new entity into a feature vector; and converting, with at least one processor, the feature data of the plurality of pre-existing entities into a feature matrix.

In some non-limiting embodiments or aspects, the method further comprises applying, with at least one processor, at least one machine learning model to the feature data of the new entity and the feature data of the plurality of pre-existing entities to determine a similarity between the new entity and the plurality of pre-existing entities.

In some non-limiting embodiments or aspects, the method further comprises selecting, with at least one processor, at least one pre-existing behavior profile of at least one pre-existing entity of the plurality of pre-existing entities based at least partially on the similarity determined between the new entity and the plurality of pre-existing entities, wherein the doppelganger behavior profile for the new entity is determined based at least partially on the selected at least one pre-existing behavior profile of the at least one pre-existing entity of the plurality of pre-existing entities.

In some non-limiting embodiments or aspects, the method further comprises applying, with at least one processor, a plurality of machine learning models to the feature data of the new entity and the feature data of the plurality of pre-existing entities to generate similarity scores from the plurality of machine learning models that define similarities between the new entity and the plurality of pre-existing entities; and analyzing, with at least one processor, the similarity scores from the plurality of machine learning models to determine at least one pre-existing entity of the plurality of pre-existing entities, wherein the doppelganger behavior profile assigned to the new entity includes a baseline of activity data from at least one behavior profile associated with the at least one pre-existing entity.

In some non-limiting embodiments or aspects, the method further comprises combining, with at least one processor, the similarity scores from the plurality of machine learning models into single statistical determinations that define the similarities between the new entity and the plurality of pre-existing entities; and determining, with at least one processor, one or more pre-existing entities of the plurality of pre-existing entities as the at least one pre-existing entity based on the single statistical determinations.

In some non-limiting embodiments or aspects, the similarity scores from the plurality of machine learning models rank the plurality of pre-existing entities according to similarity to the new entity, the method further comprising: determining, with at least one processor, one or more pre-existing entities that are ranked above a threshold ranking by a threshold number of the machine learning models; and determining, with at least one processor, the one or more entities as the at least one pre-existing entity.

In some non-limiting embodiments or aspects, the method further comprises weighting, with at least one processor, the similarity scores from the plurality of machine learning models with respect to each other based at least partially on at least one previously determined doppelganger behavior profile.

In some non-limiting embodiments or aspects, the new entity is a new account holder, a new enterprise user, or a new enterprise system.

In some non-limiting embodiments or aspects, the feature data comprises at least one of the following parameters: ages of account holders, genders of account holders, credit ratings of account holders, occupations of account holders, account or card type of account holders, applications used by account holders, countries of origin of account holders, locations of account holders, billing addresses of account holders, issuer banks of account holders, issuer bank addresses of account holders, or any combination thereof.

In some non-limiting embodiments or aspects, the feature data comprises at least one of the following parameters: depths of common ancestors in organizational hierarchies of enterprise users, job titles of enterprise users; job descriptions of enterprise users, group memberships of enterprise users, education level of enterprise users, previous employers of enterprise users, connections on social networks of enterprise users, universities of enterprise users, software downloads of enterprise users, browser history of enterprise users, application used by enterprise users, or any combination thereof.

In some non-limiting embodiments or aspects, the feature data comprises at least one of the following parameters: data center locations of enterprise systems, zone placements of enterprise systems, network placements of enterprise systems, application technical contacts of enterprise systems, application critically ratings of enterprise systems, virtualization technologies used by enterprise systems, software dependencies of enterprise systems, programming languages used by enterprise systems, ports exposed by enterprise systems, underlying operating systems of enterprise systems, communication protocols used by enterprise systems, or any combination thereof.

In some non-limiting embodiments or aspects, the method further comprises determining, with at least one processor, parameters of the feature data of the plurality of pre-existing entities used to determine the doppelganger behavior profile for the new entity based on at least one of the following: parameters of the feature data available for the new entity, a sentiment analysis, a frequency analysis, an accuracy analysis, an estimated computation time for determining the doppelganger behavior profile based on the parameters of the feature data, or any combination thereof.

According to some non-limiting embodiments or aspects, provided is a system for generating a behavior profile for a new entity to be added to a behavior-monitored system, comprising at least one server computer including at least one processor, the at least one server computer programmed and/or configured to: receive feature data of a new entity and feature data of a plurality of pre-existing entities from at least one data source, wherein the plurality of pre-existing entities are associated with a plurality of pre-existing behavior profiles; determine a doppelganger behavior profile for the new entity based at least partially on the feature data of the new entity and the feature data of the plurality of pre-existing entities; assign the doppelganger behavior profile to the new entity; and automatically implement a target action with respect to the new entity based at least partially on the doppelganger behavior profile assigned to the new entity.

In some non-limiting embodiments or aspects, the at least one server computer is programmed and/or configured to: monitor activity data of the new entity with respect to the doppelganger behavior profile assigned to the new entity; analyze the activity data of the new entity with respect to the doppelganger behavior profile assigned to the new entity to detect in an activity of the new entity at least one of fraud, an anomaly, and malicious intent; and automatically suspend at least one of an activity of the new entity, access of the new entity to a system, and a function of the new entity in a system in response to detection of the at least one of fraud, an anomaly, and malicious intent in an activity of the new entity.

In some non-limiting embodiments or aspects, the at least one server computer is programmed and/or configured to automatically provide the new entity access to an pre-existing system based at least partially on the doppelganger behavior profile assigned to the new entity.

In some non-limiting embodiments or aspects, the at least one server computer is programmed and/or configured to automatically provide a targeted offer to the new entity based at least partially on the doppelganger behavior profile assigned to the new entity.

In some non-limiting embodiments or aspects, the at least one server computer is programmed and/or configured to: convert the feature data of the new entity into a feature vector; and convert the feature data of the plurality of pre-existing entities into a feature matrix.

In some non-limiting embodiments or aspects, the at least one server computer is programmed and/or configured to apply at least one machine learning model to the feature data of the new entity and the feature data of the plurality of pre-existing entities to determine a similarity between the new entity and the plurality of pre-existing entities.

In one some non-limiting embodiments or aspects, the at least one server computer is programmed and/or configured to select at least one pre-existing behavior profile of at least one pre-existing entity of the plurality of pre-existing entities based at least partially on the similarity determined between the new entity and the plurality of pre-existing entities, wherein the doppelganger behavior profile for the new entity is determined based at least partially on the selected at least one pre-existing behavior profile of the at least one pre-existing entity of the plurality of pre-existing entities.

In some non-limiting embodiments or aspects, the at least one server computer is programmed and/or configured to: apply a plurality of machine learning models to the feature data of the new entity and the feature data of the plurality of pre-existing entities to generate similarity scores from the plurality of machine learning models that define similarities between the new entity and the plurality of pre-existing entities; and analyze the similarity scores from the plurality of machine learning models to determine at least one pre-existing entity of the plurality of pre-existing entities, wherein the doppelganger behavior profile assigned to the new entity includes a baseline of activity data from at least one behavior profile associated with the at least one pre-existing entity.

In some non-limiting embodiments or aspects, the at least one server computer is programmed and/or configured to: combine the similarity scores from the plurality of machine learning models into single statistical determinations that define the similarities between the new entity and the plurality of pre-existing entities; and determine one or more pre-existing entities of the plurality of preexisting entities as the at least one pre-existing entity based on the single statistical determinations.

In some non-limiting embodiments or aspects, the similarity scores from the plurality of machine learning models rank the plurality of pre-existing entities according to similarity to the new entity, wherein the at least one server computer is programmed and/or configured to: determine one or more pre-existing entities that are ranked above a threshold ranking by a threshold number of the machine learning models; and determine the one or more entities as the at least one pre-existing entity.

In some non-limiting embodiments or aspects the at least one server computer is programmed and/or configured to: weight the similarity scores from the plurality of machine learning models with respect to each other based at least partially on at least one previously determined doppelganger behavior profile.

In some non-limiting embodiments or aspects, the new entity is a new account holder, a new enterprise user, or a new enterprise system.

In some non-limiting embodiments or aspects, the feature data comprises at least one of the following parameters: ages of account holders, genders of account holders, credit ratings of account holders, occupations of account holders, account or card type of account holders, applications used by account holders, countries of origin of account holders, locations of account holders, billing addresses of account holders, issuer banks of account holders, issuer bank addresses of account holders, or any combination thereof.

In some non-limiting embodiments or aspects, the feature data comprises at least one of the following parameters: depths of common ancestors in organizational hierarchies of enterprise users, job titles of enterprise users; job descriptions of enterprise users, group memberships of enterprise users, education level of enterprise users, previous employers of enterprise users, connections on social networks of enterprise users, universities of enterprise users, software downloads of enterprise users, browser history of enterprise users, application used by enterprise users, or any combination thereof.

In some non-limiting embodiments or aspects, the feature data comprises at least one of the following parameters: data center locations of enterprise systems, zone placements of enterprise systems, network placements of enterprise systems, application technical contacts of enterprise systems, application critically ratings of enterprise systems, virtualization technologies used by enterprise systems, software dependencies of enterprise systems, programming languages used by enterprise systems, ports exposed by enterprise systems, underlying operating systems of enterprise systems, communication protocols used by enterprise systems, or any combination thereof.

In some non-limiting embodiments or aspects, the at least one server computer is programmed and/or configured to determine parameters of the feature data of the plurality of pre-existing entities used to determine the doppelganger behavior profile for the new entity based on at least one of the following: parameters of the feature data available for the new entity, a sentiment analysis, a frequency analysis, an accuracy analysis, an estimated computation time for determining the doppelganger behavior profile based on the parameters of the feature data, or any combination thereof.

According to some non-limiting embodiments or aspects, provided is a computer program product for generating a behavior profile for a new entity to be added to a behavior-monitored system, comprising at least one non-transitory computer-readable medium including program instructions that, when executed by at least one processor cause the at least one processor to: receive feature data of a new entity and feature data of a plurality of pre-existing entities from at least one data source, wherein the plurality of pre-existing entities are associated with a plurality of pre-existing behavior profiles; determine a doppelganger behavior profile for the new entity based at least partially on the feature data of the new entity and the feature data of the plurality of pre-existing entities; assign the doppelganger behavior profile to the new entity; and automatically implement a target action with respect to the new entity based at least partially on the doppelganger behavior profile assigned to the new entity.

Further non-limiting embodiments or aspects are set forth in the following numbered clauses:

Clause 1. A method for generating a behavior profile for a new entity to be added to a behavior-monitored system, comprising: receiving, with at least one processor, feature data of a new entity and feature data of a plurality of pre-existing entities from at least one data source, wherein the plurality of pre-existing entities are associated with a plurality of pre-existing behavior profiles; determining, with at least one processor, a doppelganger behavior profile for the new entity based at least partially on the feature data of the new entity and the feature data of the plurality of pre-existing entities; assigning, with at least one processor, the doppelganger behavior profile to the new entity; and automatically implementing, with at least one processor, a target action with respect to the new entity based at least partially on the doppelganger behavior profile assigned to the new entity.

Clause 2. The method of clause 1, further comprising: monitoring, with at least one processor, activity data of the new entity with respect to the doppelganger behavior profile assigned to the new entity; analyzing, with at least one processor, the activity data of the new entity with respect to the doppelganger behavior profile assigned to the new entity to detect in an activity of the new entity at least one of fraud, an anomaly, and malicious intent; and automatically suspending, with at least one processor, at least one of an activity of the new entity, access of the new entity to a system, and a function of the new entity in a system in response to detection of the at least one of fraud, an anomaly, and malicious intent in an activity of the new entity.

Clause 3. The method of clauses 1 or 2, further comprising automatically providing, with at least one processor, the new entity access to a pre-existing system based at least partially on the doppelganger behavior profile assigned to the new entity.

Clause 4. The method of any of clauses 1-3, further comprising automatically providing, with at least one processor, a targeted offer to the new entity based at least partially on the doppelganger behavior profile assigned to the new entity.

Clause 5. The method of any of clauses 1-4, further comprising: converting, with at least one processor, the feature data of the new entity into a feature vector; and converting, with at least one processor, the feature data of the plurality of pre-existing entities into a feature matrix.

Clause 6. The method of any of clauses 1-5, further comprising applying, with at least one processor, at least one machine learning model to the feature data of the new entity and the feature data of the plurality of pre-existing entities to determine a similarity between the new entity and the plurality of pre-existing entities.

Clause 7. The method of any of clauses 1-6, further comprising selecting, with at least one processor, at least one pre-existing behavior profile of at least one pre-existing entity of the plurality of pre-existing entities based at least partially on the similarity determined between the new entity and the plurality of pre-existing entities, wherein the doppelganger behavior profile for the new entity is determined based at least partially on the selected at least one pre-existing behavior profile of the at least one pre-existing entity of the plurality of pre-existing entities.

Clause 8. The method of any of clauses 1-7, further comprising: applying, with at least one processor, a plurality of machine learning models to the feature data of the new entity and the feature data of the plurality of pre-existing entities to generate similarity scores from the plurality of machine learning models that define similarities between the new entity and the plurality of pre-existing entities; and analyzing, with at least one processor, the similarity scores from the plurality of machine learning models to determine at least one pre-existing entity of the plurality of pre-existing entities, wherein the doppelganger behavior profile assigned to the new entity includes a baseline of activity data from at least one behavior profile associated with the at least one pre-existing entity.

Clause 9. The method of any of clauses 1-8, further comprising: combining, with at least one processor, the similarity scores from the plurality of machine learning models into single statistical determinations that define the similarities between the new entity and the plurality of pre-existing entities; and determining, with at least one processor, one or more pre-existing entities of the plurality of pre-existing entities as the at least one pre-existing entity based on the single statistical determinations.

Clause 10. The method of any of clauses 1-9, wherein the similarity scores from the plurality of machine learning models rank the plurality of pre-existing entities according to similarity to the new entity, the method further comprising: determining, with at least one processor, one or more pre-existing entities that are ranked above a threshold ranking by a threshold number of the machine learning models; and determining, with at least one processor, the one or more entities as the at least one pre-existing entity.

Clause 11. The method of any of clauses 1-10, further comprising weighting, with at least one processor, the similarity scores from the plurality of machine learning models with respect to each other based at least partially on at least one previously determined doppelganger behavior profile.

Clause 12. The method of any of clauses 1-11, wherein the new entity is a new account holder, a new enterprise user, or a new enterprise system.

Clause 13. The method of any of clauses 1-12, wherein the feature data comprises at least one of the following parameters: ages of account holders, genders of account holders, credit ratings of account holders, occupations of account holders, account or card type of account holders, applications used by account holders, countries of origin of account holders, locations of account holders, billing addresses of account holders, issuer banks of account holders, issuer bank addresses of account holders, or any combination thereof.

Clause 14. The method of any of clauses 1-13, wherein the feature data comprises at least one of the following parameters: depths of common ancestors in organizational hierarchies of enterprise users, job titles of enterprise users; job descriptions of enterprise users, group memberships of enterprise users, education level of enterprise users, previous employers of enterprise users, connections on social networks of enterprise users, universities of enterprise users, software downloads of enterprise users, browser history of enterprise users, application used by enterprise users, or any combination thereof.

Clause 15. The method of any of clauses 1-14, wherein the feature data comprises at least one of the following parameters: data center locations of enterprise systems, zone placements of enterprise systems, network placements of enterprise systems, application technical contacts of enterprise systems, application critically ratings of enterprise systems, virtualization technologies used by enterprise systems, software dependencies of enterprise systems, programming languages used by enterprise systems, ports exposed by enterprise systems, underlying operating systems of enterprise systems, communication protocols used by enterprise systems, or any combination thereof.

Clause 16. The method of any of clauses 1-15, further comprising: determining, with at least one processor, parameters of the feature data of the plurality of pre-existing entities used to determine the doppelganger behavior profile for the new entity based on at least one of the following: parameters of the feature data available for the new entity, a sentiment analysis, a frequency analysis, an accuracy analysis, an estimated computation time for determining the doppelganger behavior profile based on the parameters of the feature data, or any combination thereof.

Clause 17. A system for generating a behavior profile for a new entity to be added to a behavior-monitored system, comprising at least one server computer including at least one processor, the at least one server computer programmed and/or configured to: receive feature data of a new entity and feature data of a plurality of pre-existing entities from at least one data source, wherein the plurality of pre-existing entities are associated with a plurality of pre-existing behavior profiles; determine a doppelganger behavior profile for the new entity based at least partially on the feature data of the new entity and the feature data of the plurality of pre-existing entities; assign the doppelganger behavior profile to the new entity; and automatically implement a target action with respect to the new entity based at least partially on the doppelganger behavior profile assigned to the new entity.

Clause 18. The system of clause 17, wherein the at least one server computer is programmed and/or configured to: monitor activity data of the new entity with respect to the doppelganger behavior profile assigned to the new entity; analyze the activity data of the new entity with respect to the doppelganger behavior profile assigned to the new entity to detect in an activity of the new entity at least one of fraud, an anomaly, and malicious intent; and automatically suspend at least one of an activity of the new entity, access of the new entity to a system, and a function of the new entity in a system in response to detection of the at least one of fraud, an anomaly, and malicious intent in an activity of the new entity.

Clause 19. The system of clauses 17 or 18, wherein the at least one server computer is programmed and/or configured to automatically provide the new entity access to a pre-existing system based at least partially on the doppelganger behavior profile assigned to the new entity.

Clause 20. The system of any of clauses 17-19, wherein the at least one server computer is programmed and/or configured to automatically provide a targeted offer to the new entity based at least partially on the doppelganger behavior profile assigned to the new entity.

Clause 21. The system of any of clauses 17-20, wherein the at least one server computer is programmed and/or configured to: convert the feature data of the new entity into a feature vector; and convert the feature data of the plurality of pre-existing entities into a feature matrix.

Clause 22. The system of any of clauses 17-21, wherein the at least one server computer is programmed and/or configured to apply at least one machine learning model to the feature data of the new entity and the feature data of the plurality of pre-existing entities to determine a similarity between the new entity and the plurality of pre-existing entities.

Clause 23. The system of any of clauses 17-22, wherein the at least one server computer is programmed and/or configured to select at least one pre-existing behavior profile of at least one pre-existing entity of the plurality of pre-existing entities based at least partially on the similarity determined between the new entity and the plurality of pre-existing entities, wherein the doppelganger behavior profile for the new entity is determined based at least partially on the selected at least one pre-existing behavior profile of the at least one pre-existing entity of the plurality of pre-existing entities.

Clause 24. The system of any of clauses 17-23, wherein the at least one server computer is programmed and/or configured to: apply a plurality of machine learning models to the feature data of the new entity and the feature data of the plurality of pre-existing entities to generate similarity scores from the plurality of machine learning models that define similarities between the new entity and the plurality of pre-existing entities; and analyze the similarity scores from the plurality of machine learning models to determine at least one pre-existing entity of the plurality of pre-existing entities, wherein the doppelganger behavior profile assigned to the new entity includes a baseline of activity data from at least one behavior profile associated with the at least one pre-existing entity.

Clause 25. The system of any of clauses 17-24, wherein the at least one server computer is programmed and/or configured to: combine the similarity scores from the plurality of machine learning models into single statistical determinations that define the similarities between the new entity and the plurality of pre-existing entities; and determine one or more pre-existing entities of the plurality of preexisting entities as the at least one pre-existing entity based on the single statistical determinations.

Clause 26. The system of any of clauses 17-25, wherein the similarity scores from the plurality of machine learning models rank the plurality of pre-existing entities according to similarity to the new entity, wherein the at least one server computer is programmed and/or configured to: determine one or more pre-existing entities that are ranked above a threshold ranking by a threshold number of the machine learning models; and determine the one or more entities as the at least one pre-existing entity.

Clause 27. The system of any of clauses 17-26, wherein the at least one server computer is programmed and/or configured to: weight the similarity scores from the plurality of machine learning models with respect to each other based at least partially on at least one previously determined doppelganger behavior profile.

Clause 28. The system of any of clauses 17-27, wherein the new entity is a new account holder, a new enterprise user, or a new enterprise system.

Clause 29. The system of any of clauses 17-28, wherein the feature data comprises at least one of the following parameters: ages of account holders, genders of account holders, credit ratings of account holders, occupations of account holders, account or card type of account holders, applications used by account holders, countries of origin of account holders, locations of account holders, billing addresses of account holders, issuer banks of account holders, issuer bank addresses of account holders, or any combination thereof.

Clause 30. The system of any of clauses 17-29, wherein the feature data comprises at least one of the following parameters: depths of common ancestors in organizational hierarchies of enterprise users, job titles of enterprise users; job descriptions of enterprise users, group memberships of enterprise users, education level of enterprise users, previous employers of enterprise users, connections on social networks of enterprise users, universities of enterprise users, software downloads of enterprise users, browser history of enterprise users, application used by enterprise users, or any combination thereof.

Clause 31. The system of any of clauses 17-30, wherein the feature data comprises at least one of the following parameters: data center locations of enterprise systems, zone placements of enterprise systems, network placements of enterprise systems, application technical contacts of enterprise systems, application critically ratings of enterprise systems, virtualization technologies used by enterprise systems, software dependencies of enterprise systems, programming languages used by enterprise systems, ports exposed by enterprise systems, underlying operating systems of enterprise systems, communication protocols used by enterprise systems, or any combination thereof.

Clause 32. The system of any of clauses 17-31, wherein the at least one server computer is programmed and/or configured to determine parameters of the feature data of the plurality of pre-existing entities used to determine the doppelganger behavior profile for the new entity based on at least one of the following: parameters of the feature data available for the new entity, a sentiment analysis, a frequency analysis, an accuracy analysis, an estimated computation time for determining the doppelganger behavior profile based on the parameters of the feature data, or any combination thereof.

Clause 33. A computer program product for generating a behavior profile for a new entity to be added to a behavior-monitored system, comprising at least one non-transitory computer-readable medium including program instructions that, when executed by at least one processor cause the at least one processor to: receive feature data of a new entity and feature data of a plurality of pre-existing entities from at least one data source, wherein the plurality of pre-existing entities are associated with a plurality of pre-existing behavior profiles; determine a doppelganger behavior profile for the new entity based at least partially on the feature data of the new entity and the feature data of the plurality of pre-existing entities; assign the doppelganger behavior profile to the new entity; and automatically implement a target action with respect to the new entity based at least partially on the doppelganger behavior profile assigned to the new entity.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the non-limiting embodiments or aspects that are illustrated in the accompanying schematic figures, in which.

DETAILED DESCRIPTION

Figure 1:
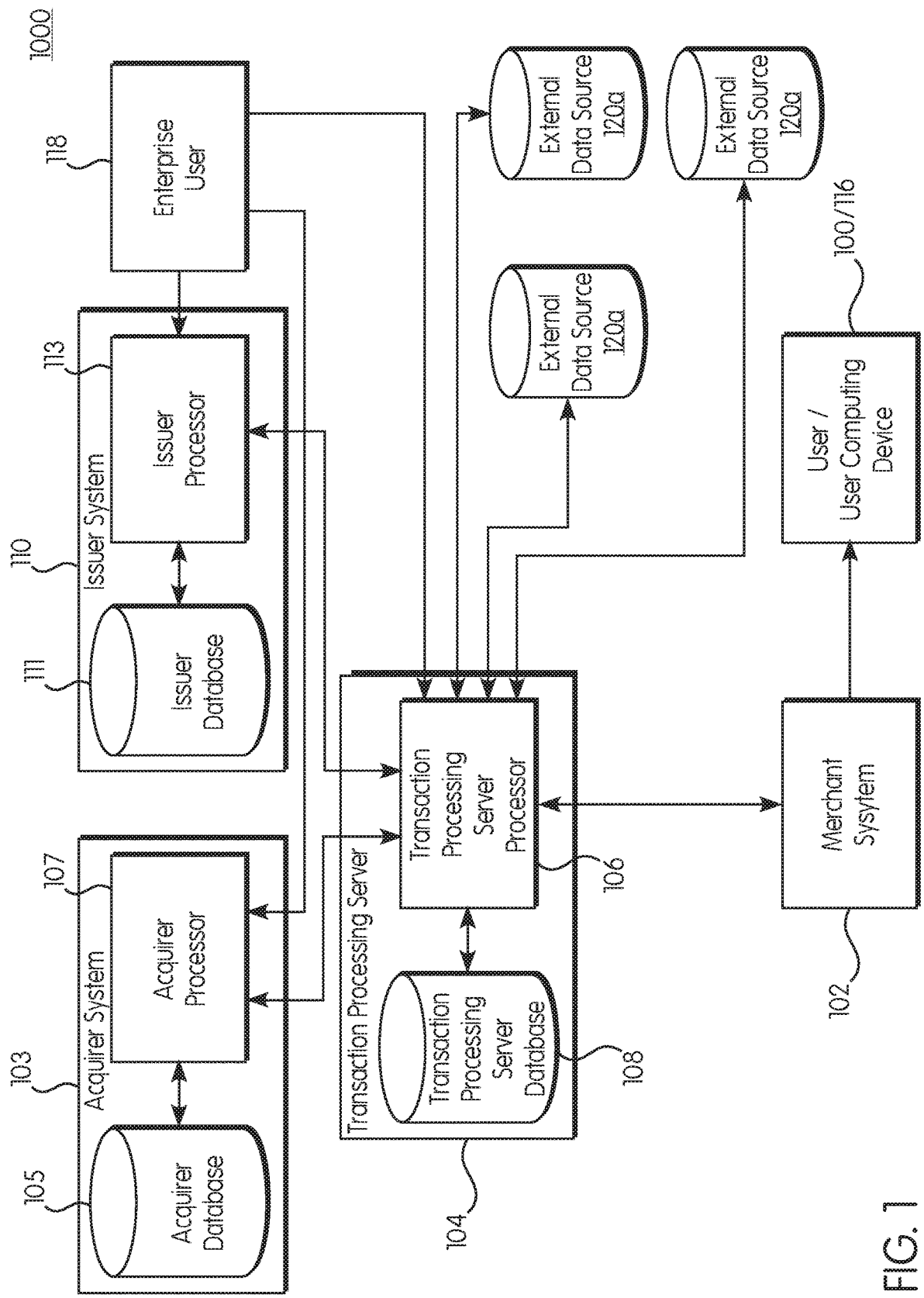
FIG. 1 is a schematic diagram of a system for generating a behavior profile for a new entity to be added to a behavior-monitored system according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step or step sequences, except where expressly specified to the contrary. It is also to be understood that the specific devices and processes illustrated in the attached drawings, and described in the following specification, are simply non-limiting embodiments or aspects of the disclosure. Hence, specific dimensions and other physical characteristics related to the non-limiting embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the terms "issuing institution," "portable financial device issuer," "issuer," or "issuer bank" may refer to one or more entities that provide accounts to customers for conducting payment transactions, such as initiating credit and/or debit payments. For example, an issuing institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases, such that they may be used to conduct a transaction without directly using the original account identifier. In some examples, an original account identifier, such as a PAN, may be associated with a plurality of tokens for different individuals or purposes. An issuing institution may be associated with a bank identification number (BIN) that uniquely identifies it. The terms "issuer" and "issuer server" may also refer to one or more computer systems operated by or on behalf of an issuing institution, such as a server computer executing one or more software applications. For example, an issuer system may include one or more authorization servers for authorizing or effecting a payment transaction.

As used herein, the term "merchant" refers to an individual or entity that provides goods and/or services, or access to goods and/or services, to customers (also referred to herein as a "consumer") based on a transaction, such as a payment transaction. "Merchant" or "merchant server" may also refer to one or more computer systems operated by or on behalf of a merchant, such as a server computer executing one or more software applications. As used herein, a "merchant system" may refer to one or more computers and/or peripheral devices used by a merchant to engage in or facilitate payment transactions with customers, including one or more point-of-sale (POS) devices, one or more card readers, near-field communication (NFC) receivers, RFID receivers, and/or other contactless transceivers or receivers, contact-based receivers, payment terminals, computers, servers, input devices, and/or other like devices that may be used to initiate, facilitate, or process a payment transaction. A merchant system may also include one or more server computers programmed and/or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer. The term "transaction service provider" may also refer to one or more computer systems operated by or on behalf of a transaction service provider, such as a server computer executing one or more software applications ("transaction processing server", e.g., VisaNet). The term "transaction processing server" (or system), may include one or more computers, processors, storage devices, databases, network interfaces, and executable instructions or code in the form of applications, APIs, software, firmware, code modules and the like operating in a network environment. When a user engages or initiates a transaction with a merchant at a point-of-sale, he or she will interact with a point-of-sale system, e.g., using a credit card, portable financial device, payment device, and/or mobile device to interact either directly or indirectly with a reader device communicating as or within the point-of-sale system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "originator" may refer to an entity that offers OCT, AFT, multi-OCT, multi-AFT, or some combination thereof services to its consumers. The originator may be a merchant, as defined above. In addition to being a merchant, the originator may or may not also be an acquirer of the transaction service provider. If the originator is not also an acquirer associated with the transaction service provider, the originator may be sponsored by an acquirer associated with the transaction service provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant, a pager, a security card, a computer, an access card, a wireless terminal, and/or a transponder, as examples. The portable financial device may include a volatile or a non-volatile memory to store information, such as an account identifier or a name of the account holder. As used herein, the information or data associated with the "portable financial device" may be used to conduct electronic or online transactions with one or more merchants, such as through on online location of the merchant.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "payment facilitator" may refer to a payment processing system operated by or on behalf of an entity that contracts with an acquirer to provide transaction service provider payment services using portable financial devices of the transaction service provider to merchants sponsored by the payment facilitator. A payment facilitator may also refer to the entity that operates such a payment processing system. The payment facilitator may execute a merchant acceptance agreement on behalf of an acquirer and/or receive settlement of transaction proceeds from an acquirer on behalf of a sponsored merchant. The payment facilitator may monitor all of its sponsored merchant activity in accordance with regulations of the transaction service provider.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant system.

Non-limiting embodiments or aspects of the present disclosure are directed to a method and system for generating a behavior profile for a new entity to be added to a behavior-monitored system. Non-limiting embodiments or aspects of the present disclosure allow for using behavior history of pre-existing entities to automatically generate a baseline for modeling behavior of new entities to reduce or eliminate a time period, which is typically at least several days, that is conventionally needed for a new entity to create a behavior history in the system before behavior modeling rules can be applied to start detecting behavioral anomalies in the behavior of the new entity. These features enable behavior-monitored systems to begin detecting behavioral anomalies in the behavior of a new entity sooner, e.g., immediately, after the new entity is added to the system. For example, a new account holder can be enrolled immediately in a payment transaction fraud detection system of a transaction service provider by generating a baseline for modeling behavior of the new account holder from a behavior history(s) of a similar pre-existing account holder(s). A new enterprise or internal user of the transaction service provider can be assigned a baseline of behavior history based on a behavior history(s) of a similar pre-existing enterprise user(s) so that the new enterprise user's behavior can be similarly monitored for malicious behavior or intent within systems of the transaction service provider by an internal monitoring system. A new enterprise system can be monitored for irregular behavior patterns immediately after the new system is added within the transaction service provider by assigning the new enterprise system a baseline behavior history based on a behavior history(s) of a similar pre-existing system(s). A pre-existing entity(s) can be identified as similar to a new entity by processing or comparing feature data of the new entity to feature data of pre-existing entities, wherein the feature data includes a set of attributes or parameters associated with each entity.

Non-limiting embodiments or aspects of the present disclosure further allow using behavior history of pre-existing entities to automatically generate a baseline for modeling behavior of new entities so that new entities can be more quickly targeted with accurate messages and incentives and/or enrolled in specific inventive programs, and/or be provided with automatic access to other systems within a behavior-monitored system. These features enable behavior-monitored systems to accurately target new entities with automatic targeting and/or enrollment systems or processes immediately after the new entities are added to the system. For example, new account holders can be provided with offers or incentives tailored to their likely behavior immediately after being added to the system, which enables the transaction service provider to more quickly target new account holders without sacrificing a success or hit rate of the offers or incentives. These features also enable behavior-monitored systems to provide immediate and automatic access to new enterprise users and/or enterprise systems to other systems. For example, a user authorized to grant the new enterprise user and/or enterprise system access to the other systems may no longer be required to manually update access authorization rules in systems of the transaction service provider, thereby eliminating a lag period during which new enterprise users and/or enterprise systems typically must wait until after access is granted to achieve full functionality.

Referring to FIG. 1, some non-limiting embodiments or aspects of a system 1000 for generating a behavior profile for a new entity to be added to a behavior monitored system is shown. A user 100 may be a holder of a portable financial device (e.g., an account holder) and use that portable financial device associated with a transaction service provider and issued by an issuer which may have an issuer system 110 operated by or on behalf of the issuer. The issuer system 110 may include an issuer processor 113 and an issuer database 111. The account holder or user 100 may use the portable financial device to initiate transactions with a merchant system 102 having a merchant point-of-sale (POS) system. In some non-limiting embodiments or aspects, the account holder or user 100 may purchase goods or services from the merchant using the portable financial device and the merchant system 102 to guarantee payment of the goods or services. In other non-limiting embodiments or aspects, an acquirer system 103, which may be operated by or on behalf of an acquirer, may originate transactions using a portable financial device of the transaction service provider. The acquirer server may include an acquirer processor 107 and an acquirer database 105. The issuer system 110 and/or the acquirer system 103 may include multiple servers or systems, across which functions of the issuer system 110 and/or the acquirer system 103 can be distributed, the issuer processor 113 and/or the acquirer processor 107 may include a single processor or multiple processors, and the issuer database 111 and/or the acquirer database 105 may be a single database or multiple databases.

With continued reference to FIG. 1, the transaction service provider may have a transaction processing server 104 operated by or on behalf of the transaction service provider. The transaction processing server 104 may include a transaction processing server processor 106 and a transaction service provider database 108. The transaction processing server processor 106 may include a single processor or multiple processors, and the transaction service provider database 108 may be a single database or multiple databases. For example, the transaction service provider database 108 may comprise an enrollment database, an account holder database, a merchant database, a data loss prevention database, an access control policy management data database, an active directory database, an application deployment database, and the like.

It will be appreciated that the transaction processing server 104 may include further computers, processors, databases, and the like, as well as multiple servers or systems, across which functions of the transaction processing server 104 can be distributed. For example, referring to FIG. 2, the transaction processing server 104 may include a plurality of transaction service provider servers 104a, 104b, 104c, and 104d. The plurality of transaction service provider servers 104a, 104b, 104c, and 104d may include corresponding transaction service provider processors 106a, 106b, 106c, and 106d and transaction service provider databases 108a, 108b, 108c, and 108d. In some non-limiting embodiments or aspects, the transaction service provider servers 104a, 104b, 104c, and 104d may be different enterprise systems 119 within the transaction service provider. An enterprise system 119 may include any system operated by or on behalf of the transaction service provider and/or any system from which a system operated by or on behalf of the transaction service provider and/or an enterprise user 118 of the transaction service provider can access and/or extract data. An enterprise user 118 may include any internal system user or employee of the transaction service provider that are granted access to one or more of the enterprise systems 119. The transaction service provider servers 104*a*, 104*b*, 104*c*, and 104*d* may differ from one another according to one or more parameters or attributes as described herein in more detail below, such as hardware or software configurations. In some non-limiting embodiments or aspects, the same transaction service provider server, e.g., transaction processing server 104*c* including transaction processing server processor 106*c* and transaction service provider database 108*c*, may implement a plurality of different enterprise systems 119. In some non-limiting embodiments or aspects, the issuer system 110, the acquirer system 103, and/or another server external to the transaction processing server 104 may comprise or implement one or more enterprise systems 119 that are accessible to one or more of the enterprise users 118 and/or enterprise systems 119 of the transaction service provider.

Figure 2:
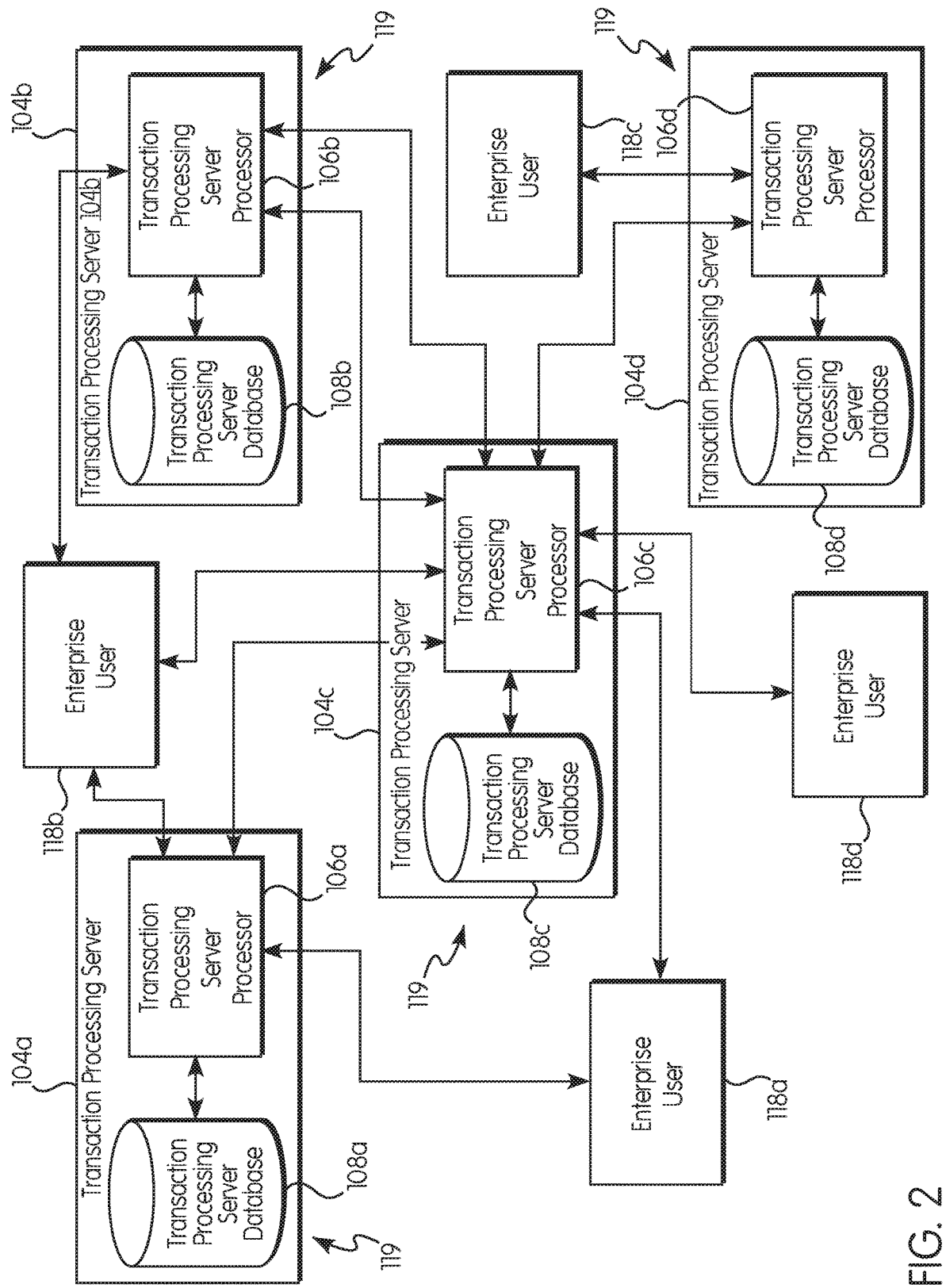
FIG. 2 is another schematic diagram of a system for generating a behavior profile for a new entity to be added to a behavior-monitored system according to the principles of the present disclosure.

With continued reference to FIGS. 1 and 2, enterprise users 118 can be granted access to one or more enterprise systems 119, and may be prevented from accessing other enterprise systems 119. For example, as shown in FIG. 1, an enterprise user 118 may be granted access to one or more enterprise systems implemented by the transaction processing server 104, the issuer system 110, and the acquirer system 103. In some non-limiting embodiments or aspects, as shown in FIG. 2, an enterprise user 118*a* may be granted access only to the transaction service provider servers 104*a* and 104*c*, an enterprise user 118*b* may be granted access only to the transaction service provider servers 104*a*, 104*b*, and 104*c*, an enterprise user 118*c* may be granted access only to the transaction processing server 104*d*, and an enterprise user 118*d* may be granted access only to the transaction processing server 104*c*.

Similarly, enterprise systems 119 of the transaction service provider can be granted access to one or more other enterprise systems 119, and may be prevented from accessing still other enterprise systems 119. For example, as shown in FIG. 2, transaction processing server 104*c* may be granted access to transaction service provider servers 104*a*, 104*b*, and 104*d*; however, transaction service provider servers 104*a*, 104*b*, and 104*c* may be granted access to only transaction service provider 104*c*. The transaction processing server 104 may also be granted access to one or more external systems which may implement one or more enterprise systems 119, such as the issuer system 110 and/or the acquirer system 103. It will be appreciated that access to a server or system by an enterprise user 118 or an enterprise system 119 may include access to all subsystems and/or databases thereof or, in some examples, access to only a portion of the subsystems and/or databases thereof, and that enterprise users 118 and enterprise systems 119 may have different levels of access to the same server or system.

With continued reference to FIG. 1, the merchant system 102 may communicate with the transaction processing server processor 106 to initiate further processing of a transaction between the merchant system 102 and the account holder or user 100. This may be in the form of a transaction authorization request to request further processing of a transaction initiated with the portable financial device. The merchant system 102 may communicate user transaction data to the transaction processing server processor 106. The user transaction data may include transaction parameters associated with transactions initiated with the portable financial device of the account holder or user 100. Non-limiting examples of transaction parameters include: primary account number (PAN), transaction amount, transaction date and time, conversion rate of currency, merchant type, acquiring institution country, PAN country, response code, merchant name/location, type of currency, and the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and the like. Other relevant response codes from the credit card issuer response codes may be included as the response code, where relevant. Further, it will be appreciated that these transaction parameters associated with transactions of the user 100 may be communicated to the transaction processing server processor 106, and may be stored in the transaction service provider database 108, for example, as activity data in association with the account holder or user 100.

The transaction processing server processor 106 may generate further transaction parameters based on the transaction parameters communicated to the transaction processing server processor 106 by the merchant system 102. These transaction parameters may include: duration portable financial device active, average monthly spend, maximum monthly spend, minimum monthly spend, frequency of use, card-based currency, geographical location, total number of transactions outside a first region, average number of transactions outside the first region over a period of time, average spend amount per transaction outside the first region, spending habits, and transaction analysis. Transaction analysis may refer to an analysis of the response codes returned for transactions imitated by the account holder or user 100. This may include factors such as, total number of time credit limit exceeded, average number of times credit limit exceeded during a time period (e.g., a year), total number of declines, average number of declines over the time period, number of times card blocked, number of times incorrect PIN entered. The transactions service provider processor 106 may receive and/or determine further transaction parameters associated with each of its users and store them in the transaction service provider database 108, for example, as activity data in association with the account holder or user 100.

The transaction service provider database 108, e.g., the account holder database, can further store personal information (e.g., name, age, gender, billing and/or mailing address including zip code, phone number, email address, social security number, driver's license number, marital status, occupation, country of origin, current location, etc.), and/or various financial information (e.g., credit score, credit score history, issuer bank, issuer bank address, bank account number, account identifier, monthly salary, yearly salary, account or card level, apps where account or card is used e.g., Uber, Lyft, Visa Checkout, etc.) about the account holders or users 100, for example, as feature data in association with the account holders or users 100. The transaction service provider database 108 may be located at or remote from the transaction processing server 104.

In some non-limiting embodiments or aspects, the transaction service provider database 108 and the activity data may include the following transaction data categories: travel and entertainment transactions, retail transactions, dining transactions, "everyday" spending transactions, or any combination thereof. For example, the activity data may define for an account holder or user 100 proportions of transactions in travel and entertainment transactions, retail transactions, dining transactions, and everyday spending transactions. Travel and entertainment category transactions may include transactions related to airlines, lodging, vehicle rental, entertainment and travel services, and the like. Retail category transactions may include transactions related to apparel and accessories, department stores, discount stores, general retail goods, electronics and home improvement stores, and the like. Dining category transactions may include transactions related to restaurants and quick service restaurants, and the like. Everyday spending category transactions may include transactions related to food and groceries, fuel, transportation, drugstores and pharmacies, and the like. Travel and entertainment transactions, retail transactions, and dining transactions may be defined as discretionary spending. Everyday spending transactions may be defined as non-discretionary spending. Any other metric may be included that is determined to be relevant for defining the purchasing or spending behavior of an account holder or user 100. In some non-limiting embodiments or aspects, the transaction service provider database 108 and activity data may include more narrowly defined transaction data categories, such as transaction data categories defined based on Merchant Category Classification (MCC) codes. MCC is used to classify a merchant by the type of goods or services the merchant provides. MCC codes can be assigned by merchant type, (e.g., one for hotels, one for office supply stores, etc.), or by merchant name (e.g., 3000 for United Airlines).

In some non-limiting embodiments or aspects, the transaction service provider database 108 and/or a behavior history or profile of an enterprise user 118 may include the following activity data: Internet and/or intranet browsing activity of an enterprise user, a remote shell(s) opened for access to an enterprise system(s) by an enterprise user, a software installation(s) from the Internet and/or an authorized portal(s) by an enterprise user, email activity of an enterprise user, a software program(s) used by an enterprise user, read, write, update, and/or create operations performed by an enterprise user in a database(s), access to sensitive data stored in a database(s) by an enterprise user, access to cryptographic keys and/or secrets by an enterprise user, and the like. In some non-limiting embodiments or aspects, the transaction service provider database 108 and/or a behavior history or profile of an enterprise system 119 may include the following activity data: network level packets sent and received by an enterprise system, a number and type of HTTP(s) requests sent and HTTP(s) responses received by an enterprise system, resource utilization activity of an enterprise system, such as, CPU activity, (e.g., a time in user and/or kernel mode), memory usage or activity, hard disk space usage or activity, a number of open file descriptors, a soft or hard limit for open file descriptors, a number of read I/O and write I/O operations for system calls, a time period since a process began, a virtual memory size, and the like.

The transaction processing server processor 106 may also be in communication with the issuer database 111 which, like the transaction service provider database 108, may include information about each account holder or user 100. The issuer database 111 may be located at or remote from the issuer system 110. The issuer database 111 may include information about each account holder or user 100, enterprise user 118, and/or enterprise system 119 collected by the issuer server 104. Some of the information in the transaction service provider database 108 and the issuer database 111 may be duplicative. Similarly, the transaction processing server processor 106 may also be in communication with the acquirer database 105 which, like the transaction service provider database 108, may include information about each account holder or user 100. The acquirer database 105 may be located at or remote from the acquirer system 103. The acquirer database 105 may include information about each account holder or user 100, enterprise user 118, and/or enterprise system 119 collected by the acquirer server 105. Some of the information in the transaction service provider database 108 and the acquirer database 105 may be duplicative.

As previously mentioned, the transaction service provider database 108 may also comprise an enrollment database, a merchant database, a data loss prevention database, an access control policy management database, an active directory database, an application deployment database, and the like. The enrollment database may include information about account holders or users 100 that are enrolled in one or more incentive programs offered by the transaction service provider, issuing institution, the merchant, the acquirer, and/or another entity. Account holders or users 100 not currently enrolled in a transaction service provider incentive program may be enrolled in a transaction service provider incentive program by being added to the enrollment database by the transaction service provider server processor 106. The enrollment database may also include specific information regarding the incentive programs being offered, such as expiration dates, terms and conditions, etc. The merchant database may include information associated with merchants, e.g., name, location, etc., and transaction parameters associated with transactions conducted with the merchants. The data loss prevention database may store information associated with enterprise systems 119 and enterprise users 118 use of the systems of the transaction service provider, such as a browsing history of enterprise users 118, software downloads and/or installs of enterprise users 118, emails or other electronic communications of enterprise users 118, data characterizing interactions between enterprise systems 119, and the like. The access control policy management database may store access controls defining access levels of enterprise users 118 and enterprise systems 119 to other enterprise systems 119. The active directory database may store information related to enterprise users 118, such as, organizational hierarchy of enterprise users 118, group memberships of enterprise users 118, job titles of enterprise users 118, job descriptions of enterprise users 118, and the like. The application deployment database may store information about applications deployed internally within the transaction service provider, e.g., hardware and software specifications and functions of the transaction service provider servers 104a, 104b, 104c, and 104d, and information about externally deployed applications, such as, applications on the user computing device 116 and applications used to operate the merchant system 102.

The transaction processing server processor 106 may receive or retrieve feature data from the transaction service provider database 108, the issuer database 111, the acquirer database 105, a plurality of external data sources or databases 120a, 120b, and 120c, or any combination thereof. The plurality of external data sources or databases 120a, 120b, 120c may include information regarding the account holders or users 100, the enterprise users 118, and/or the enterprise systems 119. For example, the external data sources may comprise social networking websites, such as Linkedin and Facebook, company websites, government websites, government or institutional data repositories, and the like.

The feature data may include parameters or attributes associated with the account holders or users 100, the enterprise users 118, and/or the enterprise systems. For example, the feature data associated with the account holders or users 100 may include at least one of the following parameters: ages of account holders, genders of account holders, credit ratings of account holders, occupations of account holders, account or card type of account holders, applications used by account holders, (e.g., Uber, Visa Checkout), countries of origin of account holders, locations of account holders, billing addresses of account holders, issuer banks of account holders, issuer bank addresses of account holders, or any combination thereof. The feature data associated with the enterprise users 118 may include at least one of the following parameters: depths of common ancestors in organizational hierarchies of enterprise users, job titles of enterprise users, job descriptions of enterprise users, group memberships of enterprise users, education level of enterprise users, previous employers of enterprise users, connections on social networks of enterprise users, universities of enterprise users, software downloads or installs of enterprise users, browser history of enterprise users, application(s) used by enterprise users, or any combination thereof. The feature data associated with the enterprise systems 119 may include at least one of the following parameters: data center locations of enterprise systems, zone placements of enterprise systems, (e.g., a business zone, a restricted zone, or a perimeter zone), network placements of enterprise systems, (e.g., a corporate network, a non-production network, a production network), application technical contacts of enterprise systems, (e.g., a specific user assigned as a technical contact for an enterprise system), application critically ratings of enterprise systems, (e.g., high, medium, low), virtualization technologies used by enterprise systems, (e.g., operating system level virtualization (containers), hypervisor-based level virtualization, such as KVM, Virtualbox, VMware workstation, and the like), software dependencies of enterprise systems, (e.g., Java JDK/JRE, Python 2.7, Guava, Boostrap.js, and the like), programming languages used by enterprise systems, ports exposed by enterprise systems, underlying operating systems of enterprise systems, communication protocols used by enterprise systems, or any combination thereof.

Figure 3:
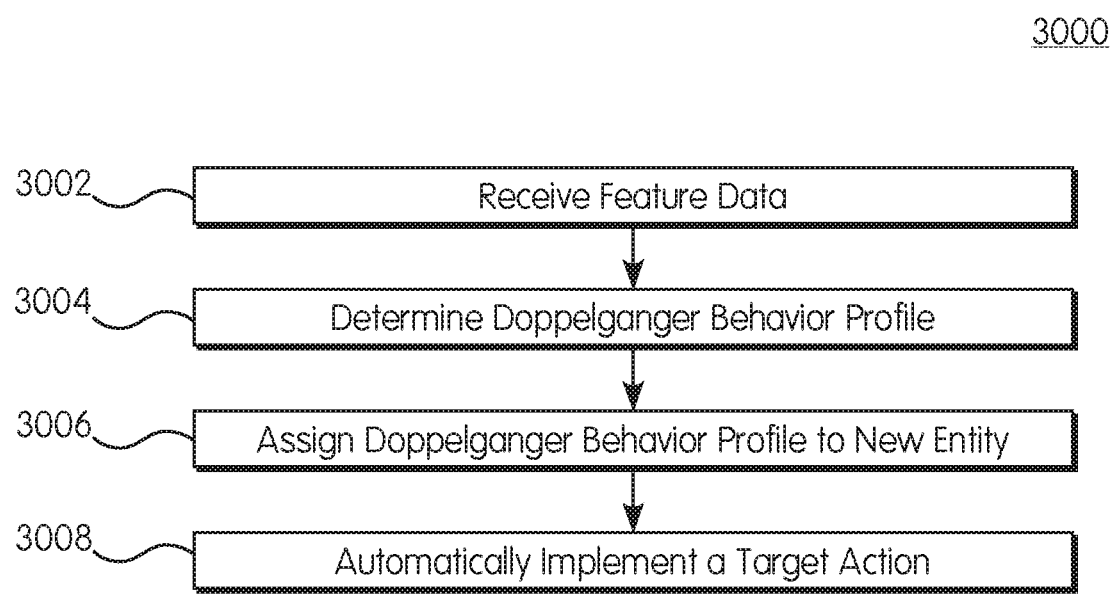
FIG. 3 is a flow diagram of a method for generating a behavior profile for a new entity to be added to a behavior-monitored system according to the principles of the present disclosure.

Referring to FIG. 3, a method 3000 is shown for generating a behavior profile for a new entity to be added to a behavior-monitored system. The method includes a step 3002 of receiving, with at least one processor, feature data of a new entity and feature data of a plurality of pre-existing entities from at least one data source, wherein the plurality of pre-existing entities are associated with a plurality of pre-existing behavior profiles. At step 3004, at least one processor determines a doppelganger behavior profile for the new entity based at least partially on the feature data of the new entity and the feature data of the plurality of pre-existing entities. At step 3006, at least one processor assigns the doppelganger behavior profile to the new entity. At step 3008, at least one processor automatically implements a target action with respect to the new entity based at least partially on the doppelganger behavior profile assigned to the new entity.

The new entity can be a new account holder or user 100, a new enterprise user 118, or a new enterprise system 119 to be added to the behavior-monitored system. The plurality of pre-existing entities may include all pre-existing entities of a same type of entity as the new entity, e.g., account holder, enterprise user, or enterprise system, associated with the transaction service provider, or a subset of pre-existing entities associated with the transaction service provider. The subset of pre-existing entities may include any number of pre-existing entities. The subset of pre-existing entities may be selected by the transaction processing server processor 106 based on an availability of feature data associated with the pre-existing entities, e.g., based on whether desired feature data for a pre-existing entity can be retrieved from the transaction service provider database 108, the issuer database 111, the acquirer database 105, or the plurality of external data sources or databases 120a, 120b, and 120c. The transaction processing server processor 106 may exclude a pre-existing entity for which the desired feature data is not available or, in other non-limiting embodiments or aspects, set one or more parameters of the feature data for that pre-existing entity to a predetermined value based on other information or data that is available for that pre-existing entity. In some non-limiting embodiments or aspects, the feature data may be collected through surveys conducted by the transaction service provider or an online portal provided by the transaction service provider.

Figure 4A:
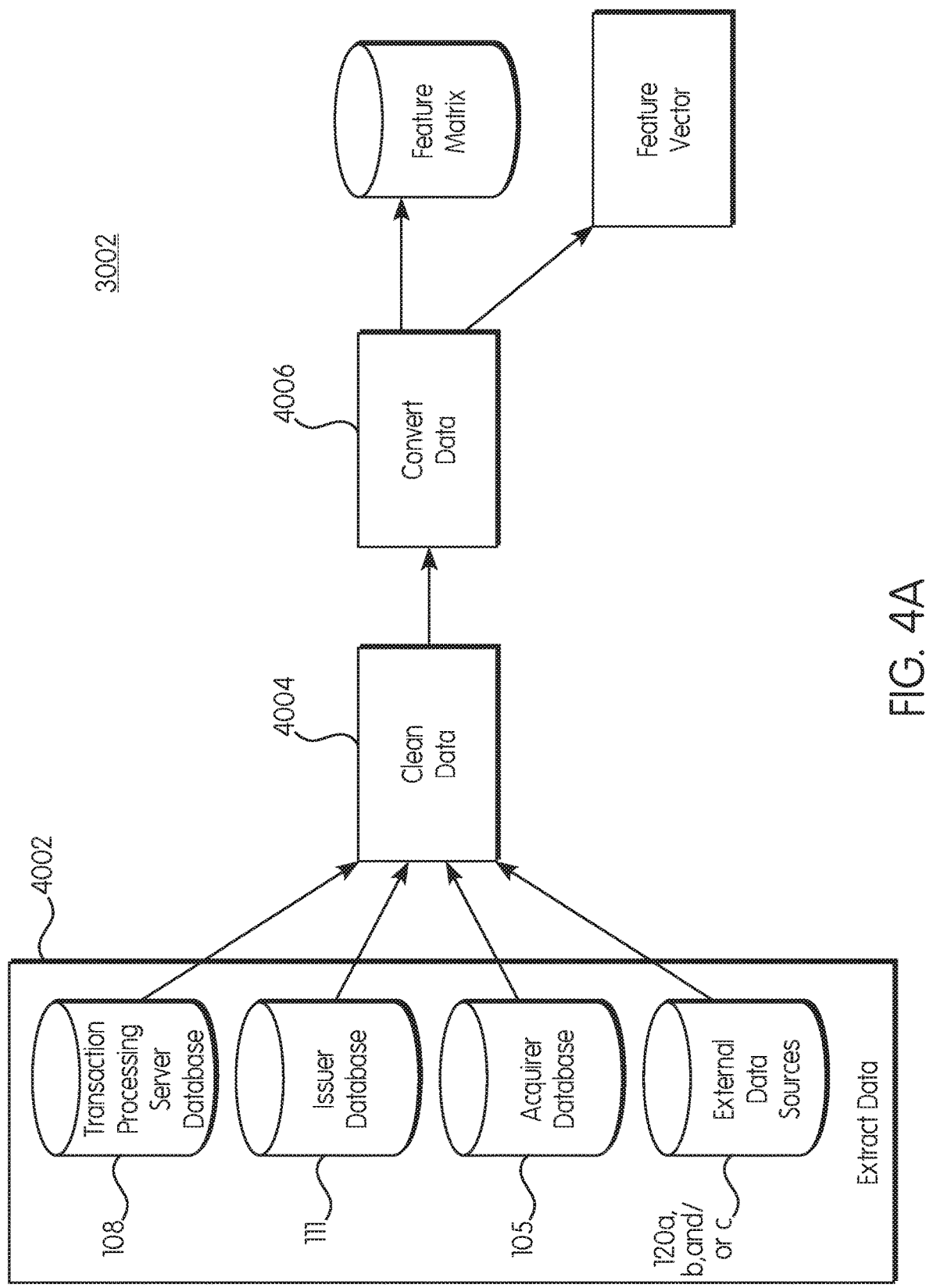
FIG. 4A is another flow diagram of a method for generating a behavior profile for a new entity to be added to a behavior-monitored system according to the principles of the present disclosure.

With continued reference to FIG. 3, and referring also to FIG. 4A, step 3002 may include extracting the feature data from one or more data sources. In some non-limiting embodiments or aspects, step 3002 may further include converting, with at least one processor, the feature data of the new entity into a feature vector; and converting, with at least one processor, the feature data of the plurality of pre-existing entities into a feature matrix. For example, in step 4002, the feature data is extracted by the transaction processing server processor 106 from the transaction service provider database 108, the issuer database 111, the acquirer database 105, and/or the plurality of external data sources or databases 120a, 120b, and 120c. In some non-limiting embodiments or aspects, the feature data can be collected during provision of the new entity in the behavior-monitored system, e.g., during provisioning of new enterprise systems 119, during enrollment of new enterprise users 118, and during an online account creation process for an account holder or user 100. The extracted feature data may be in various different formats, e.g., JavaScript Object Notation (JSON) format, Comma Separated Values (CSV) format, etc. If needed, in step 4004, the transaction processing server processor 106 cleans the feature data, e.g., by transforming, scaling, and/or normalizing parameters of the feature data. After extracting and/or cleaning the feature data, in step 4006, the transaction processing server processor 106 converts the feature data for each individual entity into a feature vector, with rows of the feature matrix corresponding to the feature vectors of individual pre-existing entities, and columns of the feature matrix corresponding to individual parameters of the feature data.

For example, if the new entity to be added to the behavior-monitored system is a new enterprise user 118, the transaction processing server processor 106 may retrieve feature data for enterprise users 118 from the transaction service provider database 108, e.g., from the data loss prevention database, the access control policy management database, and the active directory database, and one or more of the plurality of external data sources 120a, 120b, and 120c, e.g., from Linkedin. Some parameters of the feature data of the enterprise users 118, such as organizational hierarchy, job title, job description, group memberships, education level, previous employer, and university, may be received in the JSON format. Some parameters of the feature data of the enterprise users 118, such as browsing history, applications used, and software downloads or installs, may be received in the CSV format.

The transaction service processor 106 cleans the feature data extracted for the enterprise users 118 and converts the feature data into the feature vector format. For example, some parameters of the feature data, such as the organizational hierarchy of enterprise users 118, can be transformed into an n-ary tree, with each node value representing possible parameter value, e.g., a team name in the organizational hierarchy, which is converted into a discrete unique numeric value. Some parameters of the feature data, such as job title, education, previous employer, and university almamater of enterprise users 118, can be converted into discrete numeric values mapped to an original parameter value using a HashMap<interger, string>. Some parameters of the feature data, such as browsing history, application used, and software downloads or installs of the enterprise users 118, can be formalized into groups of different types, e.g., groups of different types of websites, applications, software, etc., in the form of HashMap<integer, ArrayList<string>>. Some parameters of the feature data, such as job description of enterprise users 118 may be text mined based on a named entity recognition method to categorize words therein for similarity matching.

In some non-limiting embodiments or aspects, if the new entity to be added to the behavior-monitored system is a new account holder or user 100, the transaction processing server processor 106 may retrieve feature data for account holders or users 100 from the transaction service provider database 108, e.g., from the enrollment database, the account holder database, and the merchant database. For example, the transaction processing server processor 106 may perform SQL joins and import results returned from queries to the transaction service provider database 108 into the CSV format, e.g., in order to extract and clean feature data of account holders or users 100 from the transaction service provider database 108 and convert the feature data into the feature vector format. Unique identifiers, such as account holder user IDs, may be anonymized and mapped to a single identity by mapping other identifies for other databases using HashMap<Integer, Array<integer>>. Depending on the parameters of the feature data selected for determining the doppelganger behavior profile, in some non-limiting embodiments or aspects, some parameters of the feature data of the account holders or users 100 may be cleaned and converted to the feature vector format according to the example methods described herein above with respect to parameters of the feature data for enterprise users 118, e.g., using an n-ary tree, HashMaps, text mining, etc., and vice-versa, some parameters of the feature data of the enterprise users 118 may be cleaned and converted to the feature vector format according to the example methods described herein above with respect to parameters of the feature data for account holders or users 100.

In some non-limiting embodiments or aspects, if the new entity to be added to the behavior-monitored system is a new enterprise system 119, the transaction processing server processor 106 may retrieve feature data for enterprise systems 119 from the transaction service provider database 108, e.g., from the application deployment database. Depending on the parameters of the feature data selected for determining the doppelganger behavior profile, in some non-limiting embodiments or aspects, parameters of the feature data of the enterprise systems 119 may be cleaned and converted to the feature vector format according to the example methods described herein above with respect to parameters of the feature data for enterprise users 118, e.g., using an n-ary tree, HashMaps, text mining, etc. and/or example methods described herein above with respect to parameters of the feature data for account holders or users 100, e.g., using SQL joins and to import results returned from queries to the transaction service provider database 108 into the CSV format.

In some non-limiting embodiments or aspects, at least one processor may determine parameters of the feature data of the plurality of pre-existing entities used to determine the doppelganger behavior profile for the new entity based on at least one of the following: parameters of the feature data available for the new entity, a sentiment analysis, a frequency analysis, an accuracy analysis, an estimated computation time for determining the doppelganger behavior profile based on the parameters of the feature data, or any combination thereof. For example, the transaction processing server processor 106 may remove, e.g., not include in the feature vectors and feature matrix, parameters of the feature data that the transaction processing server processor 106 determines should not be used to determine the doppelganger behavior profile. In some non-limiting embodiments or aspects, the transaction processing server processor 106 may select only parameters of the feature data that are available or have been collected for the new entity. Further, different sets of parameters of the feature data will return different results when applied to machine learning models described herein below used to determine similarity between the new entity and pre-existing entities, and metrics applied to the output of the machine learning models, such as accuracy, precision, recall, and F-score, will be different when different sets of parameters of the feature data are used. In some non-limiting embodiments or aspects, the transaction service provider 106 may iteratively perform at least one of a sentiment analysis, a frequency analysis, an accuracy analysis, or any combination thereof, on the output of the machine learning models to determine an accuracy, a precision, a recall, and/or an F-score for that output, and choose a set of parameters of the feature data that returns the highest accuracy, precision, recall, and/or F-score for use in determining similarity between the new entity and the pre-existing entities. In some non-limiting embodiments or aspects, the transaction processing server processor 106 may estimate an amount of computation time required to determine the doppelganger behavior profile for the new entity based on a selected set of parameters of the feature data. For example, extracting, cleaning, and applying the machine learning models to some parameters of the feature data may require a much longer computation time than other parameters of the feature data, and the transaction processing server processor 106 may select the set of parameters to ensure that the computation time is below a threshold time.

Figure 4B:
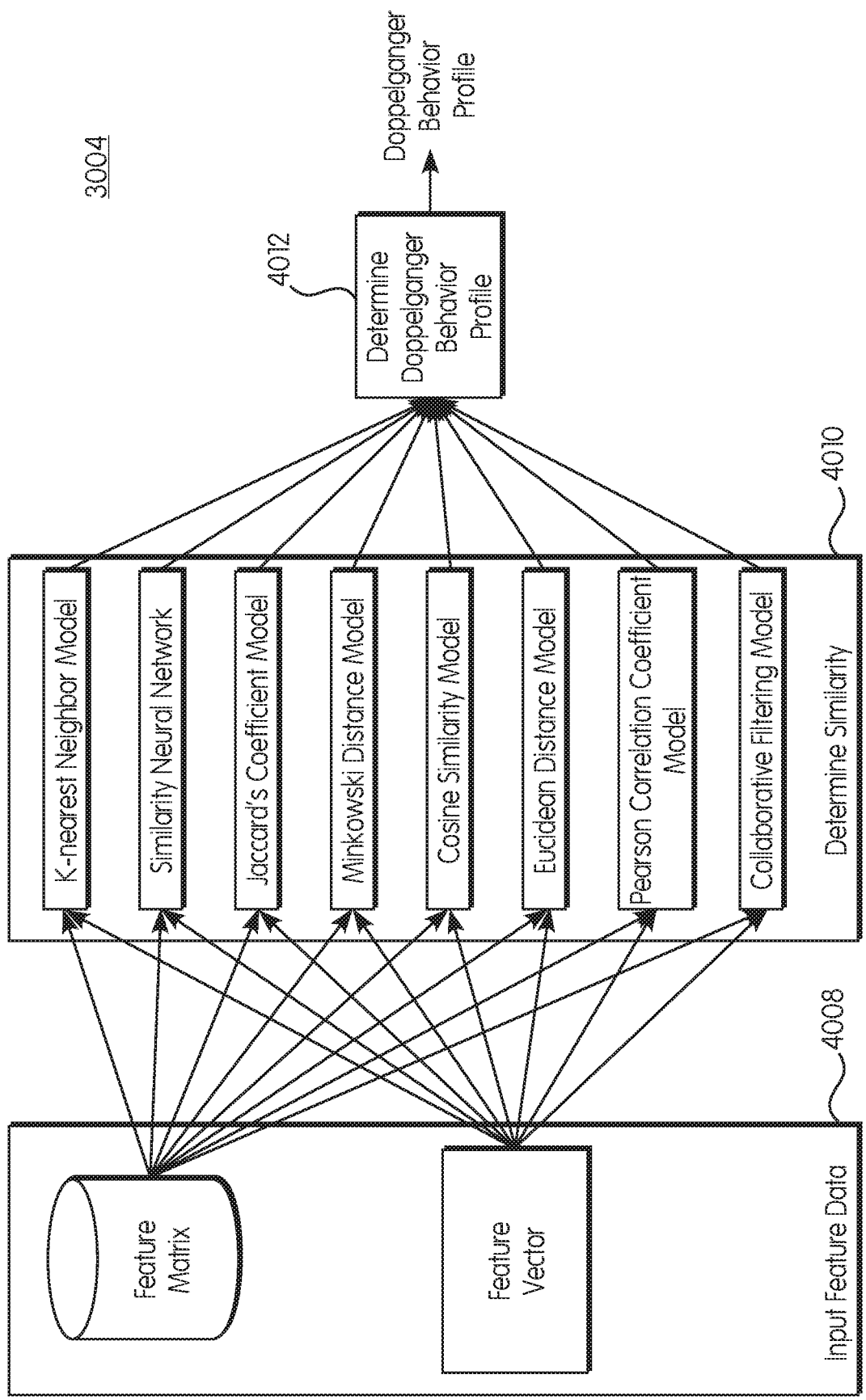
FIG. 4B is another flow diagram of a method for generating a behavior profile for a new entity to be added to a behavior-monitored system according to the principles of the present disclosure.

With continued reference to FIGS. 1-3, and referring also to FIG. 4B, step 3004 may include applying, with at least one processor, at least one machine learning model to the feature data of the new entity and the feature data of the plurality of pre-existing entities to determine a similarity between the new entity and the plurality of pre-existing entities. For example, as shown in FIG. 4B, in step 4008, the transaction processing server processor 106 can apply the feature matrix for the plurality of pre-existing entities and the feature vector for the new entity as inputs to at least one machine learning model. In step 4010, the at least one machine learning model determines a similarity between the new entity and the plurality of pre-existing entities using the feature matrix for the plurality of pre-existing entities and the feature vector for the new entity. The output from the at least one machine learning model indicates a similarity between the new entity and the plurality of pre-existing entities. In some non-limiting embodiments or aspects, the plurality of pre-existing entities may be ranked according to their determined similarity to the new entity and/or each pre-existing entity may be associated with a score that indicates a similarity of that pre-existing entity to the new entity.

The at least one machine learning model may be any machine-learning model capable of determining "similarity" between the new entity and the pre-existing entities. For example, the at least one machine learning model may be any machine learning model that determines similarity using clustering, distance measurements, and/or deep learning. In some non-limiting embodiments or aspects, the at least one machine learning model may include at least one of the following: a K-nearest neighbor model, a similarity neural network including multi-layer perceptron, a Jaccard's co-efficient model, a Minkowski distance model, a cosine similarity model, a Euclidean distance model, a Pearson correlation coefficient model, a collaborative filtering model, or any combination thereof. It will be appreciated that, in other non-limiting embodiments, the machine learning models include other various advanced statistical methods and tools for determining similarity between a new entity and pre-existing entities using feature data associated therewith. The at least one machine learning model may be prepared by applying the feature data of the plurality of pre-existing entities to a corresponding at least one machine learning algorithm.

In some non-limiting embodiments or aspects, at least one processor may apply a plurality of machine learning models to the feature data of the new entity and the feature data of the plurality of pre-existing entities to generate similarity scores from the plurality of machine learning models that define similarities between the new entity and the plurality of pre-existing entities, and analyze the similarity scores from the plurality of machine learning models to determine at least one pre-existing entity of the plurality of pre-existing entities, wherein the doppelganger behavior profile assigned to the new entity includes a baseline of activity data from at least one behavior profile associated with the at least one pre-existing entity. The plurality of machine learning algorithms may include any combination of models capable of determining "similarity" between the new entity and the pre-existing entities described herein. For example, FIG. 4B shows, in step 4010, separately applying the feature matrix for the plurality of pre-existing entities and the feature vector for the new entity to each of the following machine learning models: a K-nearest neighbor model, a similarity neural network including multi-layer perceptron, a Jaccard's co-efficient model, a Minkowski distance model, a cosine similarity model, a Euclidean distance model, a Pearson correlation coefficient model, and a collaborative filtering model. Each of the plurality of machine learning models outputs its own similarity score that defines similarities between the new entity and the plurality of pre-existing entities according to that model. For example, the plurality of machine learning algorithms can provide a unique applied usage of clustering, distance measurement, neural networks, and the like, with feature sets from multiple different data sources and use-cases applied to same models for solving the same problem statement of determining similarity to find a doppelganger behavior profile for a new entity to be added to a behavior monitored system.

With continued reference to FIG. 4B, step 4012 may include selecting, with at least one processor, at least one pre-existing behavior profile of at least one pre-existing entity of the plurality of pre-existing entities based at least partially on the similarity determined between the new entity and the plurality of pre-existing entities, wherein the doppelganger behavior profile for the new entity is determined based at least partially on the selected at least one pre-existing behavior profile of the at least one pre-existing entity of the plurality of pre-existing entities. For example, the transaction processing server processor 106 can analyze the output from each of the plurality of machine learning models (or from a single machine learning model) to determine at least one pre-existing entity of the plurality of pre-existing entities from which a baseline of activity data from at least one behavior profile associated with the at least one pre-existing entity is used to generate the doppelganger behavior profile. For example, the transaction processing server processor 106 may assign the new entity the behavior profile of a determined pre-existing entity as the doppelganger behavior profile to serve as a baseline behavior history for the pre-existing entity. A time period over which a baseline of activity data for the behavior profile(s) of the pre-existing entities is used to determine the doppelganger behavior profile may be any time period that can provide a baseline of activity data that can be used to begin detecting behavioral anomalies in the behavior of a new entity immediately after the new entity is added to the system, more quickly target new entities with accurate messages and incentives and/or enroll new entities in specific inventive programs, and/or provide new entities with automatic access to other systems within a behavior-monitored system. For example, in some non-limiting embodiments or aspects, the time period may be a few day or, in other examples, the time period may be several weeks, several months, or several years.

In some non-limiting embodiments or aspects, step 4012 may include combining, with at least one processor, the similarity scores from the plurality of machine learning models into single statistical determinations that define the similarities between the new entity and the plurality of pre-existing entities; and determining, with at least one processor, one or more pre-existing entities of the plurality of preexisting entities as the at least one pre-existing entity based on the single statistical determinations. For example, the transaction processing server processor 106 can combine the similarity scores by determining a statistical mean, median, or average of the similarity scores. The single statistical determination can rank the plurality of pre-existing entities according to their determined similarity to the new entity and/or associate each pre-existing entity with a score that indicates a similarity of that pre-existing entity to the new entity, and the transaction processing server processor 106 may assign the new entity the behavior profile of the pre-existing entity having the highest ranking and/or closest similarity as indicated by the similarity scores.

In some non-limiting embodiments or aspects, the similarity scores from the plurality of machine learning models may rank the plurality of pre-existing entities according to similarity to the new entity, and step 4012 may include determining, with at least one processor, one or more pre-existing entities that are ranked above a threshold ranking by a threshold number of the machine learning models; and determining, with at least one processor, the one or more entities as the at least one pre-existing entity. For example, the transaction processing server processor 106 may assign the new entity the behavior profile of a pre-existing entity that is ranked as having the highest similarity by a majority of the similarity scores of the machine learning models. If no pre-existing entity is ranked as having the highest similarity by a majority of the similarity scores, the transaction service provide 106 may assign the new entity the behavior profile of a pre-existing entity that is ranked above a threshold percentage in similarity to the new entity, e.g., in the top 5 percent of pre-existing entities, by a majority of the similarity scores of the machine learning models.

With continued reference to FIG. 4B, in some embodiments or aspects, step 4012 may include selecting, with at least one processor, two or more pre-existing behavior profiles of two or more entities of the plurality of pre-existing entities based at least partially on the similarity determined between the new entity and the plurality of pre-existing entities, wherein the doppelganger behavior profile for the new entity is determined based at least partially on the selected two or more pre-existing behavior profiles of the two or more pre-existing entities of the plurality of pre-existing entities. The transaction processing server processor 106 can analyze the output from each of the plurality of machine learning models to determine the two or more pre-existing entities from which activity data from the two or more behavior profiles is used to generate the doppelganger behavior profile. The transaction processing server processor 106 may determine to use behavior profiles of two or more pre-existing entities to generate the doppelganger behavior profile based on the similarity scores from the plurality of machine learning models. For example, if multiple pre-existing entities are ranked above a threshold percentage in similarity to the new entity by the single statistical determination or, if multiple pre-existing entities are ranked above a threshold percentage in similarity to the new entity by a threshold number of the plurality of machine learning model's similarity scores, the transaction processing server processor 106 can select the behavior profiles of the multiple entities to use in determining the doppelganger behavior profile.

The transaction processing server processor 106 combines the behavior profiles from the two or more entities to generate the doppelganger behavior profile. For example, the transaction processing server processor 106 may average parameters of the two or more behavior profiles of the selected two or more pre-existing entities and assign the averaged behavior profile as the doppelganger behavior profile to serve as a baseline behavior history for the pre-existing entity. In some non-limiting embodiments or aspects, the transaction service provider server 106 may select portions from behavior profiles of each of the selected two or more pre-existing entities to determine the doppelganger security profile. For example, a first portion of a behavior profile of a first selected pre-existing entity that is related to a first behavior, e.g., transaction locations for an account holder, may be selected for the doppelganger behavior profile in response to the first entity being determined as more similar to the new entity than other entities of the selected two or more entities with respect to first feature data associated with the first behavior, e.g., current location, and a second portion of a behavior profile of a second selected pre-existing entity that is related to a second behavior, e.g., transaction frequency for an account holder, may be selected for the doppelganger behavior profile in response to the second entity being determined as more similar to the new entity than other entities of the selected two or more entities with respect to second feature data associated with the second behavior, e.g., credit rating for an account holder.

In other non-limiting embodiments or aspects, the transaction processing server processor 106 may select portions from behavior profiles of each of the selected two or more pre-existing entities based on a particular machine learning model(s) that ranks or scores a particular entity above the other selected two or more entities. For example, a first machine learning model(s) may be configured to provide greater accuracy than other machine learning models with respect to a first parameter of the baseline of activity data defining the doppelganger behavior profile, and a second machine learning model(s) may be configured to provide greater accuracy than the other machine learning models with respect to a second parameter of baseline of activity data defining the doppelganger behavior profile.

Referring again to FIG. 3, in step 3006, the transaction processing server processor 106 may assign the doppelganger behavior profile to the new entity in the behavior-monitored system. For example, the transaction processing server processor 106 may automatically update information associated with the new entity in the transaction service provider database 108 to include the doppelganger behavior profile for the new entity. The doppelganger behavior profile may be selected immediately as a post-provisioning or enrollment step for the new entity in the behavior-monitored system.

With continued reference to FIG. 3, step 3008 may include monitoring, with at least one processor, activity data of the new entity with respect to the doppelganger behavior profile assigned to the new entity; analyzing, with at least one processor, the activity data of the new entity with respect to the doppelganger behavior profile assigned to the new entity to detect in an activity of the new entity at least one of fraud, an anomaly, and malicious intent; and automatically suspending, with at least one processor, at least one of an activity of the new entity, access of the new entity to a system, and a function of the new entity in a system in response to detection of the at least one of fraud, an anomaly, and malicious intent in an activity of the new entity.

For example, the target action may include an anomaly deterrence action including automatic monitoring of the activity of the new entity and/or automatic suspension, in response to detection of fraudulent, anomalous, or malicious activity, an access, activity, and/or function of the new entity in the behavior-monitored system. An anomaly deterrence action may also include any other action directed to detecting, deterring, or preventing fraudulent, anomalous, or malicious activity, associated with a new entity. For example, the transaction processing server processor 106 can automatically suspend, in response to detection of the at least one of fraud, an anomaly, and malicious intent, at least one of an activity of the new entity, access of the new entity to a system, and a function of the new entity in a system The transaction processing server processor 106 can analyze or compare the activity data of the new entity, which can include activities over a past, present, and/or future period of time for the for the new entity, to the doppelganger behavior profile for the new entity, which provides a baseline of activity data for the new entity. For example, the transaction processing server processor 106 may automatically suspend the at least one of an activity of the new entity, access of the new entity to a system, and a function of the new entity in a system based at least partially on a determination that the activity data for the new entity indicates activity that is substantially different than a baseline of activity defined in the doppelganger behavior profile for the new entity. For example, if a new entity has activity data over a period of time showing activity substantially different than activity defined by the doppelganger behavior profile, the transaction processing server processor 106 can use this information in making a determination that the new entity is associated with the at least one of fraud, an anomaly, and malicious intent, and automatically suspend the activity, access, and/or function of the new entity. A threshold level for determining a substantial difference between a new entity's activity data and the doppelganger behavior profile may be determined by the transaction processing server processor 106 based on any of the information included in the transaction service provider database 108, as previously described. For example, a substantial difference can be determined based on a standard deviation (or any other statistical measurement of difference) between the new entity's activity data and a baseline of activity data defined by the doppelganger behavior profile.

For example, with continued reference to FIG. 3, and referring again to FIG. 1, if the new entity is a new account holder or user 100, step 5010 may include automatically initiating a fraud deterrence action to suspend, with at least one processor and in response to detecting fraudulent activity, at least one of a transaction activity of the account of the user 100 and access of the account of the user 100 to a system. For example, the transaction processing server processor 106 may cancel a current transaction being attempted by the account holder or user 100, void one or more previous transactions completed by the account holder or user 100, prevent all future transactions attempted by the account holder or user 100, prevent or cancel transactions of the account holder or user 100 at specific merchants, (e.g., merchants at which the card was not used prior to determination of the fraudulent activity), prevent or cancel transactions of the account holder or user 100 at merchants associated with specific transaction data categories, prevent future transactions attempted by the account for a predetermined period of time, and the like. The transaction processing server processor 106 may automatically suspend access of the account holder or user 100 and/or a third party to an otherwise accessible online portal or management website for the account or to certain subsystems of the online portal or management website, such as subsystems providing user information and/or account information.

In other non-limiting embodiments or aspects, the fraud deterrence action may include automatically generating and/or transmitting a communication to a computing device 116 of the account holder or user 100 indicating that fraudulent activity has been detected. The communication may include an electronic link, such as a URL, embedded script, or application, that causes the computing device 116 of the account holder or user 100 to automatically access, at the transaction processing server 104, issuer system 110, acquirer system 103, merchant system 102, or any combination thereof, information related to the fraudulent activity when the account holder or user 100 opens or accesses the communication on their device 116. For example, the communication may provide an indication that fraudulent activity has been detected with an option for the account holder or user 100 to receive more information about the activity, such as, times, dates, types of transactions, amounts of transactions, merchants at which the transactions were conducted, reasons for the determination as fraud, and the like. The communication may provide the account holder or user 100 with an option to flag in a system of the transaction processing server 104, issuer system 110, and/or acquirer system 103 via their computing device 116 specific transactions as fraudulent or not via the electronic links and/or an option to be automatically connected to a fraud representative at the transaction service provider, the issuing institution, and/or acquirer.

If the new entity is a new enterprise user 118 or a new enterprise system 119, in step 5010 the transaction processing server processor 106 may automatically prevent the new enterprise user 118 or new enterprise system 119 from accessing other systems in the behavior monitored system in response to detecting at least one of fraud, an anomaly, and malicious intent in activity data of the new enterprise user 118 or the new enterprise system 119. For example, referring also to FIG. 2, the transaction processing server processor 106 may suspend access of a new enterprise user 118a or a new enterprise system 119, such as transaction processing server 104a, to the systems that these entities would otherwise be able to access, e.g., the transaction processing server 104c in FIG. 2, in response to detecting the at least one of fraud, an anomaly, and malicious intent in activity data of the new enterprise user 118a or the new enterprise system 119 based on the doppelganger behavior profile. In some examples, the transaction processing server processor 106 may prevent the new enterprise user 118 from performing specific activities or functions in the transaction service provider processor 104, such as creating new accounts, transferring money, creating and/or deleting information or data, and the like. Similarly, the transaction processing server processor 106 may present the new enterprise system 119 from performing specific activities or functions with respect to other enterprise systems, such as communicating with the other enterprise systems, creating and/or deleting information or data in the other enterprise systems, and the like.

The transaction processing server processor 106 can compare the activity data of a new enterprise user 118 to the doppelganger behavior profile of the new enterprise user 118 using one or more rules to determine that activity of the new enterprise user 118 includes an unusual software download(s) or installation(s), unusual transmission of data, unusual access to specific machine(s) or system(s), unusual querying of data, and the like. For example, the transaction processing server processor 106 can determine that the activity data of the new enterprise user 118 includes malicious intent, such as, a ransomware software download and/or installation, a Trojan or other virus download and/or installation, transmission of sensitive data to outside the transaction service provider's systems, access of machines or systems outside of the transaction service provider's systems, querying of data at successive time intervals, a bulk query of data, and the like.

The transaction processing server processor 106 can compare the activity data of a new enterprise system 119 to the doppelganger behavior profile of the new enterprise system 119 using one or more rules to determine that activity of the new enterprise system 119 includes irregular patterns or malicious intent, such as, unusual open file descriptors, unusual CPU utilization, unusual system calls, unusually low process uptime, an unusual number of packets being sent and received, unusual software being downloaded and/or installed on a host operating system, and the like. For example, the transaction processing server processor 106 can determine that the activity data of the new enterprise system 119 includes malicious intent, such as, execution of unauthorized processes, unauthorized access to data or other systems, and the like.

With continued reference to FIG. 3, and referring also to FIGS. 1 and 2, in some non-limiting embodiments or aspects, step 3008 may include automatically providing, with at least one processor, the new entity access to a pre-existing system based at least partially on the doppelganger behavior profile assigned to the new entity. For example, the target action may include the transaction processing server processor 106 automatically updating the transaction service provider database 108, e.g., the access control management database, with new access controls that enable a new enterprise user 118 and/or a new enterprise system 119 to access other systems. For example, referring also to FIG. 2, the transaction processing server processor 106 can determine a doppelganger behavior profile assigned to a new enterprise system 119, e.g., new transaction processing server 104b in FIG. 2, as substantially similar to a behavior profile of a pre-existing enterprise system 119, e.g., pre-existing transaction processing server 104a in FIG. 2, and automatically provide the new enterprise system 119 with access to some or all of the same systems as the pre-existing enterprise system 119, e.g., access to transaction processing server 104c in FIG. 2. Similarly, the transaction processing server processor 106 can determine a doppelganger behavior profile assigned to a new enterprise entity 118 as substantially similar to a behavior profile of a pre-existing enterprise entity 118 and automatically provide the new enterprise entity 118 with access to some or all of the same systems as the pre-existing enterprise entity 118.

With continued reference to FIG. 3, in some non-limiting embodiments or aspects, step 3008 may include automatically providing, with at least one processor, a targeted offer to the new entity based at least partially on the doppelganger behavior profile assigned to the new entity. For example, the target action may include the transaction processing server processor 106 automatically enrolling a new account holder or user 100 in at least one incentive program by communicating with the transaction service provider database 108, e.g., the enrollment database. The incentive program may include any program that provides a benefit to the new account holder or user 100. The benefit may be provided to the new account holder or user 100 contingent on past, present, or future use of their portable financial device(s). The benefit may be in the form of a discount, coupon, cash back, promotional item, sweepstakes, or any other incentive to the account holder or user 100. The new account holder or user 100 may be entered into one or multiple incentive programs. The new account holder or user 100 may be entered into the incentive program(s) for which the activity data, e.g., transaction data categories, of the doppelganger behavior profile for the new account holder or entity 100 substantially match. For example, proportions of transactions in the plurality of transaction data categories indicated by the doppelganger behavior profile for the new account holder or user may be compared to rules defining requirements for proportions of transactions in the plurality of transaction data categories for entry into the incentive program(s), and the new account holder or user 100 may be automatically entered into an incentive program(s) by the transaction processing server processor 106 when a substantial match between the activity data and the rules is determined.

In some non-limiting embodiments or aspects, automatically enrolling a new account holder or user 100 in the incentive program(s) may cause a benefit to be transmitted to a computing device 116, such as a mobile device, of the account holder or user 100, such as, but not limited to, a voucher in an electronic wallet application. In other non-limiting embodiments or aspects, the transaction processing server processor 106 can generate and/or transmit a targeted communication to the computing device 116 of the new account holder or user 100. The communication may include information regarding use of their portable financial device 103, including the benefits of using the portable financial device 103. The communication may also include an offer to enter at least one incentive program as described above. This communication may be sent in combination with automatically enrolling the user 100 in an incentive program (e.g., a notification communication notifying the user 100 of enrollment in an incentive program). The communication may be automatically generated and sent to the computing device 116 of the user 100 by the transaction processing server processor 106. The communication may take any communication form, including a web-based communication, an email communication, a text message, a telephone call, a push notification, and/or an instant message. The user 100 may respond to the communication. A targeted offer may also include any other action directed to incentivizing, educating, or encouraging a user 100 in the subset to more frequently use their portable financial device 103.

With continued reference to FIG. 3, in some non-limiting embodiments or aspects, in step 3008, at least one processor may weight the similarity scores from the plurality of machine learning models with respect to each other based at least partially on at least one previously determined doppelganger behavior profile. For example, the target action may include the transaction processing server processor 106 using a feedback loop to weight more heavily the similarity scores from a machine learning model(s) that provide more accurate results for the at least one previously determined doppelganger profile. The transaction service provider 106 may iteratively perform at least one of a sentiment analysis, a frequency analysis, an accuracy analysis, or any combination thereof, on the output of the machine learning models to determine an accuracy, a precision, a recall, and/or an F-score for that output, and choose a weighting for each of the machine learning models that returns the highest accuracy, precision, recall, and/or F-score for use in determining similarity between the new entity and the pre-existing entities. In some non-limiting embodiments or examples, the transaction service provider 106 can completely remove a particular machine learning model(s) from process.

With continued reference to FIG. 3, and referring back to FIGS. 1 and 2, in some non-limiting embodiments or aspects, step 3008, as described above, may instead or additionally be performed by the issuer system 110 and/or the acquirer system 103. The issuer system 110 and/or the acquirer system 103 may be in communication with the transaction processing server 104 to receive information from the transaction processing server 104, such as the doppelganger behavior profile for a new entity and/or activity data of a new entity. The issuer system 110 and/or the acquirer system 103, from the information received from the transaction processing server 104, may initiate the previously described suspension of at least one of an activity of the new entity, access of the new entity to a system, and a function of the new entity in a system in response to detection of the at least one of fraud, an anomaly, and malicious intent in an activity of the new entity, and/or automatically initiate a target communication to the entity or automatically provide the new entity access to a system. In other words, the issuer system 110 and/or the acquirer system 103 may automatically enroll the new entity in an incentive program by communicating with the transaction service provider database 108, an issuer database 111, and/or an acquirer database 105, automatically provide the new entity access to one or more systems in the transaction processing server 104, the issuer system 110, and/or the acquirer system 103, or automatically monitor the activity data of the new entity with respect to the doppelganger behavior profile for the new entity, and automatically suspend at least one of an activity of the new entity, access of the new entity to a system, and a function of the new entity in a system in response to detection of the at least one of fraud, an anomaly, and malicious intent in an activity of the new entity.

In other non-limiting examples, the issuer system 110 and/or the acquirer system 103 may communicate with a computing device 116 of a new account holder or user 100, as described above. Further, it will be appreciated that the issuer system 110 and/or the acquirer system 103 may take any other action directed to incentivizing, educating, or encouraging a new account holder or user 100 to more frequently use their portable financial device, as described above, and/or to detect fraudulent activity in the financial transactions of the new account holder or user 100. It is to be understood that the transaction processing server 104, the issuer system 110, and/or the acquirer system 103 may automatically initiate the targeted communication(s) and/or the fraud deterrence action(s).

In some non-limiting embodiments or aspects, a computer program product for generating a behavior profile for a new entity to be added to a behavior-monitored system includes at least one non-transitory computer readable medium including program instructions that, when executed by at least one processor, cause the at least one processor to execute the previously-described method (e.g., method 3000). The at least one processor may include the transaction processing server processor 106 and/or one or more processors in the issuer system 110 and/or the acquirer system 103.

The computer program product may include a plurality of computer-readable media, such as a first computer-readable medium and a second computer readable medium. The first computer-readable medium may be located at the transaction processing server 104. The second computer-readable medium may be located remote from the transaction service provider server, such as at the issuer system 110 and/or the acquirer system 103, and/or distributed across two or more of the transaction service provider servers 104a, 104b, 104c, and 104d.

EXAMPLES

Figure 5:
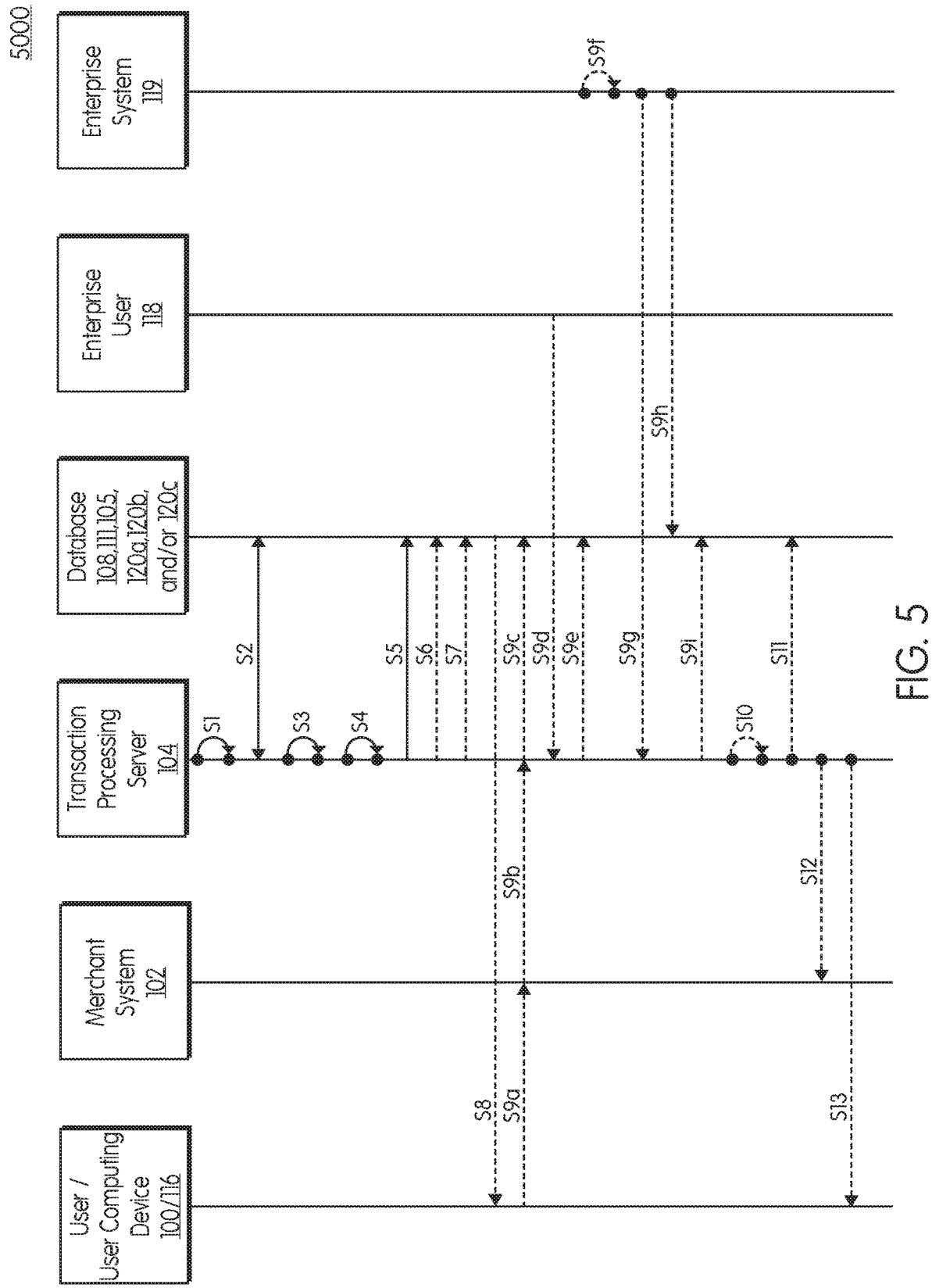
FIG. 5 is a sequence diagram for generating a behavior profile for a new entity to be added to a behavior-monitored system according to principles of the present disclosure.

Referring to FIG. 5, a process flow diagram shows an exemplary process 5000 for generating a behavior profile for a new entity to be added to a behavior-monitored system. It will be appreciated that the steps shown in the process flow diagram are for exemplary purposes only and that in various non-limiting embodiments or aspects, additional or fewer steps may be performed to generate a behavior profile for a new entity to be added to a behavior-monitored system.

At a first step (s1), a new entity is provisioned in the transaction processing server 104 to be added to the behavior-monitored system. In a second step (s2), the transaction processing server processor 106 retrieves or receives feature data of the new entity and feature data of a plurality of pre-existing entities from the transaction service provider database 108, the acquirer database 105, the issuer database 111, and/or the external data sources 120a, 120b, 120c. In some non-limiting embodiments or aspects, if the new entity is a new account holder or user 100, the feature data comprises at least one of the following parameters: ages of account holders, genders of account holders, credit ratings of account holders, occupations of account holders, account or card type of account holders, applications used by account holders, countries of origin of account holders, locations of account holders, billing addresses of account holders, issuer banks of account holders, issuer bank addresses of account holders, or any combination thereof. In some non-limiting embodiments, if the new entity is a new enterprise user 118, the feature data comprises at least one of the following parameters: depths of common ancestors in organizational hierarchies of enterprise users, job titles of enterprise users; job descriptions of enterprise users, group memberships of enterprise users, education level of enterprise users, previous employers of enterprise users, connections on social networks of enterprise users, universities of enterprise users, software downloads of enterprise users, browser history of enterprise users, application used by enterprise users, or any combination thereof. In some non-limiting embodiments, if the new entity is a new enterprise system 119, the feature data comprises at least one of the following parameters: data center locations of enterprise systems, zone placements of enterprise systems, network placements of enterprise systems, application technical contacts of enterprise systems, application critically ratings of enterprise systems, virtualization technologies used by enterprise systems, software dependencies of enterprise systems, programming languages used by enterprise systems, ports exposed by enterprise systems, underlying operating systems of enterprise systems, communication protocols used by enterprise systems, or any combination thereof.

In a third step (s3), the transaction processing server processor 106 converts the feature data of the new entity into a feature vector and converts the feature data of the plurality of pre-existing entities into a feature matrix for the plurality of pre-existing entities. In a fourth step (s4), the transaction processing server processor 106 determines a doppelganger behavior profile for the new entity based at least partially on the feature data of the new entity and the feature data of the plurality of pre-existing entities. For example, the transaction processing server processor 106 applies at least one machine learning model to the feature vector for the new entity and the feature matrix for the plurality of pre-existing entities to determine a similarity between the new entity and the plurality of pre-existing entities, and selects at least one pre-existing behavior profile of at least one pre-existing entity of the plurality of pre-existing entities based at least partially on the similarity determined between the new entity and the plurality of pre-existing entities. The doppelganger behavior profile for the new entity is determined based at least partially on the selected at least one pre-existing behavior profile of the at least one pre-existing entity of the plurality of pre-existing entities.

In a fifth step (s5), the transaction processing server processor 106 assigns the doppelganger behavior profile to the new entity, for example, by updating information associated with the new entity in the transaction service provider database 108 to include the doppelganger behavior profile for the new entity. In some non-limiting embodiments or aspects, if the new entity is a new enterprise user 118 or a new enterprise system 119, in a sixth step (s6), the transaction processing server processor 106 may automatically provide the new entity access to one or more systems in the transaction processing server 104, the issuer system 110, and/or the acquirer system 103, for example, by updating the transaction service provider database 108, e.g., the access control management database, the issuer database 111, and/or the acquirer database 105 with new access controls that enable a new enterprise user 118 and/or a new enterprise system 119 to access specific systems therein. In some non-limiting embodiments or aspects, in a seventh step (s7), if the new entity is a new account holder or user 100, the transaction processing server 104 may automatically enroll the new account holder or user 100 in at least one incentive program (s7) by automatically updating information associated with the new account holder or user 100 in the transaction service provider database 108, e.g., the enrollment database, the issuer database 111, and/or the acquirer database 105 to indicate that the new account holder or user 100 is enrolled in the incentive program(s). The incentive program(s) that the new account holder or user 100 is enrolled in may be determined based on the doppelganger behavior profile assigned to the new account holder or user 100. In some non-limiting embodiments or aspects, in an eighth step (s8), the transaction processing server 104 may automatically transmit a communication to a computing device 116 of the new account holder or user 100 to incentivize, educate, or encourage the new account holder or user 100 to more frequently use their portable financial device. The content of the communication may be determined based on the doppelganger behavior profile assigned to the new account holder or user 100, e.g., a targeted offer or incentive.

In a ninth step (s9a-s9i), the transaction processing server 104 may monitor activity data of the new entity with respect to the doppelganger behavior profile assigned to the new entity. For example, if the new entity is a new account holder or user 100, after the new account holder or user 100 is added to the behavior-monitored system, the new account holder or user 100 initiates and completes a financial transaction using a portable financial device associated with the transaction service provider (s9a). The transaction may be a financial transaction with a merchant system 102. In the case of a financial transaction with the merchant system 102, the new account holder or user 100 provides information from his/her personal financial device, such as an account identifier (e.g., 16-digit PAN) and, in some examples, to complete a financial transaction in exchange for goods or services offered by the merchant. The merchant system 102, in response, processes the transaction. The merchant system 102 (s9b) sends transaction data concerning the financial transaction between the merchant system 102 and the account holder or user 100 to the transaction processing server 104. Information sent to the transaction service provider server may include: date and time of the transaction, location of the transaction including a geographic code of the merchant and/or a geographic code associated with the account of the user 100, amount of the transaction, type of goods or services purchased, and/or the like. The transaction processing server 104 relays the information collected regarding the user's transaction(s) as the activity data to the transaction service provider database 108 (s9c). The steps s9a through s9c of FIG. 5 may be performed for any number of transactions for the new account holder or user 100.

If the new entity is a new enterprise user 118, after the new enterprise user 118 is added to the behavior-monitored system, the new enterprise user 118 accesses (s9d) the transaction processing server 104 and/or the transaction service provider database 108 to perform one or more activities, functions or operations in the transaction processing server 104 and/or the database 108. For example, the new enterprise user 118 may add or delete data, create or delete accounts or groups of accounts, download and/or install software, access and transmit emails, access and browse the Internet, use one or more applications, and the like within one or more enterprise systems 119 of the transaction service provider. The transaction processing server 104 can collect and store as the activity data information regarding the enterprise user's access in the transaction service provider database 108 (s9e). The steps s9d through s9e of FIG. 5 may be performed for any number of transactions for the new enterprise user 118.

Similarly, if the new entity is a new enterprise system 119, the new enterprise system performs one or more activities, functions, and/or operations (s9f) and/or accesses (s9g) other systems in the transaction service provide server 104 and/or the transaction service provider database 108 to perform one or more activities functions or operations in the transaction processing server 104. For example, the new enterprise system 119 can execute one or more virtualization technologies and/or software applications, communicate via one or more specific ports using one or more specific communication protocols, create or delete data, transfer or access money or accounts, and the like. The enterprise system 119 (s9h) and/or the transaction processing server 104 (s9i) can collect and store as the activity data information regarding the activities, function, and/or operation of the new enterprise system 119 in the transaction service provider database 108. The steps s9f through s9h of FIG. 5 may be performed for any number of operations for the new enterprise system.

It is noted that as new activity data is created and stored for the new entity, a significance of the baseline of activity data defined by the doppelganger behavior is reduced. For example, the activity data that is created and stored for the new entity based on the activities of the new entity is used to update the behavior profile of the new entity that is initially defined by the doppelganger behavior profile, which reduces the impact of the baseline of the activity data from the doppelganger behavior profile on the overall behavior profile of the new entity as additional activity data is continuously added to thereto.

In a tenth step (s10), the transaction processing server 104 may analyze the activity data of the new entity with respect to the doppelganger behavior profile assigned to the new entity to detect in an activity of the new entity at least one of fraud, an anomaly, and malicious intent. For example, the transaction processing server 104 can compare the activity data of the new entity to the doppelganger behavior profile of the new entity using one or more rules by applying one or more fraud, anomaly and/or malicious intent detection rules configured to detect or determine fraud, an anomaly, and/or malicious intent in the activity of the new entity with respect to the baseline activity of the new entity defined by the doppelganger behavior profile. The transaction processing server 104 may automatically suspend at least one of an activity of the new entity, access of the new entity to a system, and a function of the new entity in a system in response to detection of the at least one of fraud, an anomaly, and malicious intent in an activity of the new entity. For example, in an eleventh step (s11), the transaction processing server 104 may automatically transmit information associated with the new entity to the transaction service provider database 108 to flag the new entity as associated with the detected, anomaly, and/or malicious intent and/or to suspend an activity and/or access of the new entity to the all or a portion of the transaction processing server 104. In some non-limiting embodiments or examples, if the new entity is a new account holder or user 100, in a twelfth step (s12), the transaction processing server 104 may automatically transmit information regarding the new account holder or user 100 to the merchant POS system 108 to notify the merchant that the at least one account is now associated with fraudulent activity and/or to cancel a transaction attempted with the merchant system 106 by the at least one account. In some non-limiting embodiments or aspects, in a thirteenth step (s13), the transaction processing server 104 may automatically transmit a communication to a computing device 116 of the account holder or user 100 to notify the account holder or user 100 that the at least one account is now associated with fraudulent activity.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment may be combined with one or more features of any other embodiment.

The invention claimed is:

1. A method comprising:

in response to and immediately after a new entity being added to a fraud detection system:

receiving, with at least one processor, feature data of the new entity and feature data of a plurality of pre-existing entities from at least one data source, wherein the plurality of pre-existing entities are associated with a plurality of pre-existing behavior profiles and the new entity is not associated with a pre-existing behavior profile;

estimating, with at least one processor, an amount of computation time for generating a doppelganger behavior profile for the new entity based on the feature data of the new entity, the feature data of the plurality of pre-existing entities, and a plurality of machine-learning models;

selecting, with at least one processor, a set of parameters of the feature data of the new entity and the feature data of the plurality of pre-existing entities that reduce the amount of computation time for generating the doppelganger behavior profile for the new entity, wherein selecting the set of parameters comprises iteratively performing at least one of a sentiment analysis, a frequency analysis, an accuracy analysis, or any combination thereof on an output of the plurality of machine-learning models to determine an accuracy, a precision, a recall, and/or an F-score for the output and selecting the set of parameters based on the determined accuracy, precision, recall and/or F-score;

generating, with at least one processor, the doppelganger behavior profile for the new entity based at least partially on the set of parameters of the feature data of the new entity and the feature data of the plurality of pre-existing entities, wherein generating the doppelganger behavior profile comprises:

generating a plurality of similarity scores for each entity of the plurality of pre-existing entities based on inputting a portion of the feature data of the new entity and a portion of the feature data of the plurality of pre-existing entities into the plurality of machine-learning models, wherein each similarity score of the plurality of similarity scores defines a similarity between the new entity and an entity of the plurality of pre-existing entities based on an output of a machine-learning model of the plurality of machine-learning models;

determining a single similarity score for each entity of the plurality of pre-existing entities based on the plurality of similarity scores for the entity;

ranking the plurality of pre-existing entities based on the single similarity score for each entity of the plurality of pre-existing entities, to produce a ranking;

selecting two or more pre-existing entities of the plurality of pre-existing based on the ranking;

combining behavior profiles of the two or more preexisting entities to produce the doppelganger behavior profile for the new entity;

assigning, with at least one processor, the doppelganger behavior profile to the new entity; and monitoring, with at least one processor, activity data of the new entity with respect to the doppelganger behavior profile assigned to the new entity;

analyzing, with at least one processor, the activity data of the new entity with respect to the doppelganger behavior profile assigned to the new entity;

detecting, with at least one processor, in an activity of the new entity at least one of fraud, an anomaly, and malicious intent, based on the doppelganger behavior profile assigned to the new entity; and automatically suspending, with at least one processor, at least one of an activity of the new entity, access of the new entity to a system, and a function of the new entity in a system in response to detection of the at least one of fraud, an anomaly, and malicious intent.

2. The method of claim 1, further comprising automatically providing, with at least one processor, the new entity access to a pre-existing system based at least partially on the doppelganger behavior profile assigned to the new entity.

3. The method of claim 1, further comprising automatically providing, with at least one processor, a targeted offer to the new entity based at least partially on the doppelganger behavior profile assigned to the new entity.

4. The method of claim 1, further comprising:

converting, with at least one processor, the feature data of the new entity into a feature vector; and converting, with at least one processor, the feature data of the plurality of pre-existing entities into a feature matrix.

5. The method of claim 1, wherein the new entity is a new account holder, a new enterprise user, or a new enterprise system.

6. The method of claim 1, wherein the feature data comprises at least one of the following parameters: ages of account holders, genders of account holders, credit ratings of account holders, occupations of account holders, account or card type of account holders, applications used by account holders, countries of origin of account holders, locations of account holders, billing addresses of account holders, issuer banks of account holders, issuer bank addresses of account holders, or any combination thereof.

7. The method of claim 1, wherein the feature data comprises at least one of the following parameters: depths of common ancestors in organizational hierarchies of enterprise users, job titles of enterprise users; job descriptions of enterprise users, group memberships of enterprise users, education level of enterprise users, previous employers of enterprise users, connections on social networks of enterprise users, universities of enterprise users, software downloads of enterprise users, browser history of enterprise users, application used by enterprise users, or any combination thereof.

8. The method of claim 1, wherein the feature data comprises at least one of the following parameters: data center locations of enterprise systems, zone placements of enterprise systems, network placements of enterprise systems, application technical contacts of enterprise systems, application critically ratings of enterprise systems, virtualization technologies used by enterprise systems, software dependencies of enterprise systems, programming languages used by enterprise systems, ports exposed by enterprise systems, underlying operating systems of enterprise systems, communication protocols used by enterprise systems, or any combination thereof.

9. A system comprising at least one server computer including at least one processor, the at least one server computer programmed and/or configured to:

in response to and immediately after a new entity being added to a fraud detection system:
  receive feature data of the new entity and feature data of a plurality of pre-existing entities from at least one data source, wherein the plurality of pre-existing entities are associated with a plurality of pre-existing behavior profiles and the new entity is not associated with a pre-existing behavior profile;
  estimate an amount of computation time for generating a doppelganger behavior profile for the new entity based on the feature data of the new entity, the feature data of the plurality of pre-existing entities, and a plurality of machine-learning models;
  select a set of parameters of the feature data of the new entity and the feature data of the plurality of pre-existing entities that reduce the amount of computation time for generating the doppelganger behavior profile for the new entity, wherein selecting the set of parameters comprises iteratively performing at least one of a sentiment analysis, a frequency analysis, an accuracy analysis, or any combination thereof on an output of the plurality of machine-learning models to determine an accuracy, a precision, a recall, and/or an F-score for the output and selecting the set of parameters based on the determined accuracy, precision, recall and/or F-score;
  generate the doppelganger behavior profile for the new entity based at least partially on the set of parameters of the feature data of the new entity and the feature data of the plurality of pre-existing entities, wherein, when generating the doppelganger behavior profile, the at least one server computer is programmed and/or configured to:
    generate a plurality of similarity scores for each entity of the plurality of pre-existing entities based on inputting a portion of the feature data of the new entity and a portion of the feature data of the plurality of pre-existing entities into the plurality of machine-learning models, wherein each similarity score of the plurality of similarity scores defines a similarity between the new entity and an entity of the plurality of pre-existing entities based on an output of a machine-learning model of the plurality of machine-learning models;
    determine a single similarity score for each entity of the plurality of pre-existing entities based on the plurality of similarity scores for the entity;
    rank the plurality of pre-existing entities based on the single similarity score for each entity of the plurality of pre-existing entities, to produce a ranking;
    select two or more pre-existing entities of the plurality of pre-existing based on the ranking;
    combine behavior profiles of the two or more pre-existing entities to produce the doppelganger behavior profile for the new entity;
    assign the doppelganger behavior profile to the new entity; and
  monitor activity data of the new entity with respect to the doppelganger behavior profile assigned to the new entity;
  analyze the activity data of the new entity with respect to the doppelganger behavior profile assigned to the new entity;
  detect in an activity of the new entity at least one of fraud, an anomaly, and malicious intent, based on the doppelganger behavior profile assigned to the new entity; and
  automatically suspend at least one of an activity of the new entity, access of the new entity to a system, and a function of the new entity in a system in response to detection of the at least one of fraud, an anomaly, and malicious intent.

10. The system of claim 9, wherein the at least one server computer is programmed and/or configured to automatically provide the new entity access to a pre-existing system based at least partially on the doppelganger behavior profile assigned to the new entity.

11. The system of claim 9, wherein the at least one server computer is programmed and/or configured to automatically provide a targeted offer to the new entity based at least partially on the doppelganger behavior profile assigned to the new entity.

12. The system of claim 9, wherein the at least one server computer is programmed and/or configured to:
  convert the feature data of the new entity into a feature vector; and
  convert the feature data of the plurality of pre-existing entities into a feature matrix.

13. The system of claim 9 wherein the new entity is a new account holder, a new enterprise user, or a new enterprise system.

14. A computer program product comprising at least one non-transitory computer-readable medium including program instructions that, when executed by at least one processor, cause the at least one processor to:
  in response to and immediately after a new entity being added to a fraud detection system:
    receive feature data of the new entity and feature data of a plurality of pre-existing entities from at least one data source, wherein the plurality of pre-existing entities are associated with a plurality of pre-existing behavior profiles and the new entity is not associated with a pre-existing behavior profile;
    estimate an amount of computation time for generating a doppelganger behavior profile for the new entity based on the feature data of the new entity, the feature data of the plurality of pre-existing entities, and a plurality of machine-learning models;
    select a set of parameters of the feature data of the new entity and the feature data of the plurality of pre-existing entities that reduce the amount of computation time for generating the doppelganger behavior profile for the new entity, wherein selecting the set of parameters comprises iteratively performing at least one of a sentiment analysis, a frequency analysis, an accuracy analysis, or any combination thereof on an output of the plurality of machine-learning models to determine an accuracy, a precision, a recall, and/or an F-score for the output and selecting the set of parameters based on the determined accuracy, precision, recall and/or F-score;
    generate the doppelganger behavior profile for the new entity based at least partially on the set of parameters of the feature data of the new entity and the feature data of the plurality of pre-existing entities, wherein the program instructions that cause the at least one processor to generate the doppelganger behavior profile cause the at least one processor to:
      generate a plurality of similarity scores for each entity of the plurality of pre-existing entities based on inputting a portion of the feature data of the new entity and a portion of the feature data of the plurality of pre-existing entities into the plurality of machine-learning models, wherein each similarity score of the plurality of similarity scores defines a similarity between the new entity and an entity of the plurality of pre-existing entities based on an output of a machine-learning model of the plurality of machine-learning models;

determine a single similarity score for each entity of the plurality of pre-existing entities based on the plurality of similarity scores for the entity;

rank the plurality of pre-existing entities based on the single similarity score for each entity of the plurality of pre-existing entities, to produce a ranking;

select two or more pre-existing entities of the plurality of pre-existing based on the ranking;

combine behavior profiles of the two or more pre-existing entities to produce the doppelganger behavior profile for the new entity;

assign the doppelganger behavior profile to the new entity; and monitor activity data of the new entity with respect to the doppelganger behavior profile assigned to the new entity;

analyze the activity data of the new entity with respect to the doppelganger behavior profile assigned to the new entity;

detect in an activity of the new entity at least one of fraud, an anomaly, and malicious intent, based on the doppelganger behavior profile assigned to the new entity; and automatically suspend at least one of an activity of the new entity, access of the new entity to a system, and a function of the new entity in a system in response to detection of the at least one of fraud, an anomaly, and malicious intent.

* * * * *